US012573398B2

(12) United States Patent
Reyes et al.

(10) Patent No.: US 12,573,398 B2
(45) Date of Patent: Mar. 10, 2026

(54) CONVERSATIONAL ARTIFICIAL INTELLIGENCE PLATFORM

(71) Applicant: PayPal, Inc., San Jose, CA (US)

(72) Inventors: Oliver Jamero Reyes, San Jose, CA (US); Ajay Aswal, Fremont, CA (US); Vinaykanth Manthena, Fremont, CA (US); Krishnaperumal Periyasamy, Lathrop City, CA (US); Hong Lu, Union City, CA (US)

(73) Assignee: PayPal, Inc., San Jose, CA (US)

( * ) Notice: Subject to any disclaimer, the term of this patent is extended or adjusted under 35 U.S.C. 154(b) by 112 days.

(21) Appl. No.: 18/474,977

(22) Filed: Sep. 26, 2023

(65) Prior Publication Data

US 2025/0104702 A1 Mar. 27, 2025

(51) Int. Cl.
| | |
|---|---|
| *G10L 15/18* | (2013.01) |
| *G10L 15/22* | (2006.01) |
| *G10L 15/26* | (2006.01) |
| *H04M 3/493* | (2006.01) |

(52) U.S. Cl.
CPC .......... *G10L 15/22* (2013.01); *G10L 15/1822* (2013.01); *G10L 15/26* (2013.01); *H04M 3/493* (2013.01)

(58) Field of Classification Search
CPC ..... G10L 15/1822; G10L 15/22; G10L 15/26; H04M 3/493; H04M 3/5166; G06Q 30/016
USPC ........................................................ 704/275
See application file for complete search history.

(56) References Cited

U.S. PATENT DOCUMENTS

| | | | |
|---|---|---|---|
| 11,663,422 B2 | 5/2023 | Pandey | |
| 12,022,026 B2 * | 6/2024 | Edwards | H04M 3/5166 |
| 2022/0308918 A1 | 9/2022 | Pandey | |
| 2022/0328050 A1 | 10/2022 | Hennig | |
| 2023/0141096 A1 * | 5/2023 | Bleak | G10L 15/26 704/270 |
| 2024/0311841 A1 * | 9/2024 | Shanthraj | G06Q 30/016 |

FOREIGN PATENT DOCUMENTS

WO 2022133153 A1 6/2022

* cited by examiner

*Primary Examiner* — Md S Elahee
(74) *Attorney, Agent, or Firm* — Kowert, Hood, Munyon, Rankin & Goetzel, P.C.; Dean M. Munyon

(57) ABSTRACT

Techniques are disclosed that relate to a computer system implementing a conversational artificial intelligence platform. The computer system may receive a request that includes text data specifying an utterance of a user. The computer system determines, form the utterance, an intent of the user. The computer system selects a first virtual agent to handle the request based on the determined intent. The computer system routes the text data and subsequent text data of the request to the first virtual agent for handling. The computer system receives, from the first virtual agent, a message that the determined intent is incorrect, the message including state information indicative of actions taken by the first virtual agent relative to the request. The computer system selects a second virtual agent to handle the request based on the state information. The computer system may receive input from an interactive voice response system or another channel.

20 Claims, 14 Drawing Sheets

*Intent map*
*320*

| Intent<br>*352* | Virtual Agent ID<br>*354* |
|---|---|
| "change shipping address" | 354A |
| "cancel transaction" | 354B, 354C |
| "add phone number" | 354D |

400

User
401

Orchestration module
120

Intent determination service
305

Payment information virtual agent
130A

Send request: "I'd like to add a credit card to my account"
402

Request intent detection
404

406

Determined intent: Add card

Get payment information agent configuration
408

Add card request: "1234-5678-9012-3456"
410

412

Add card response: "success"

414

Receive response: "Card added successfully"

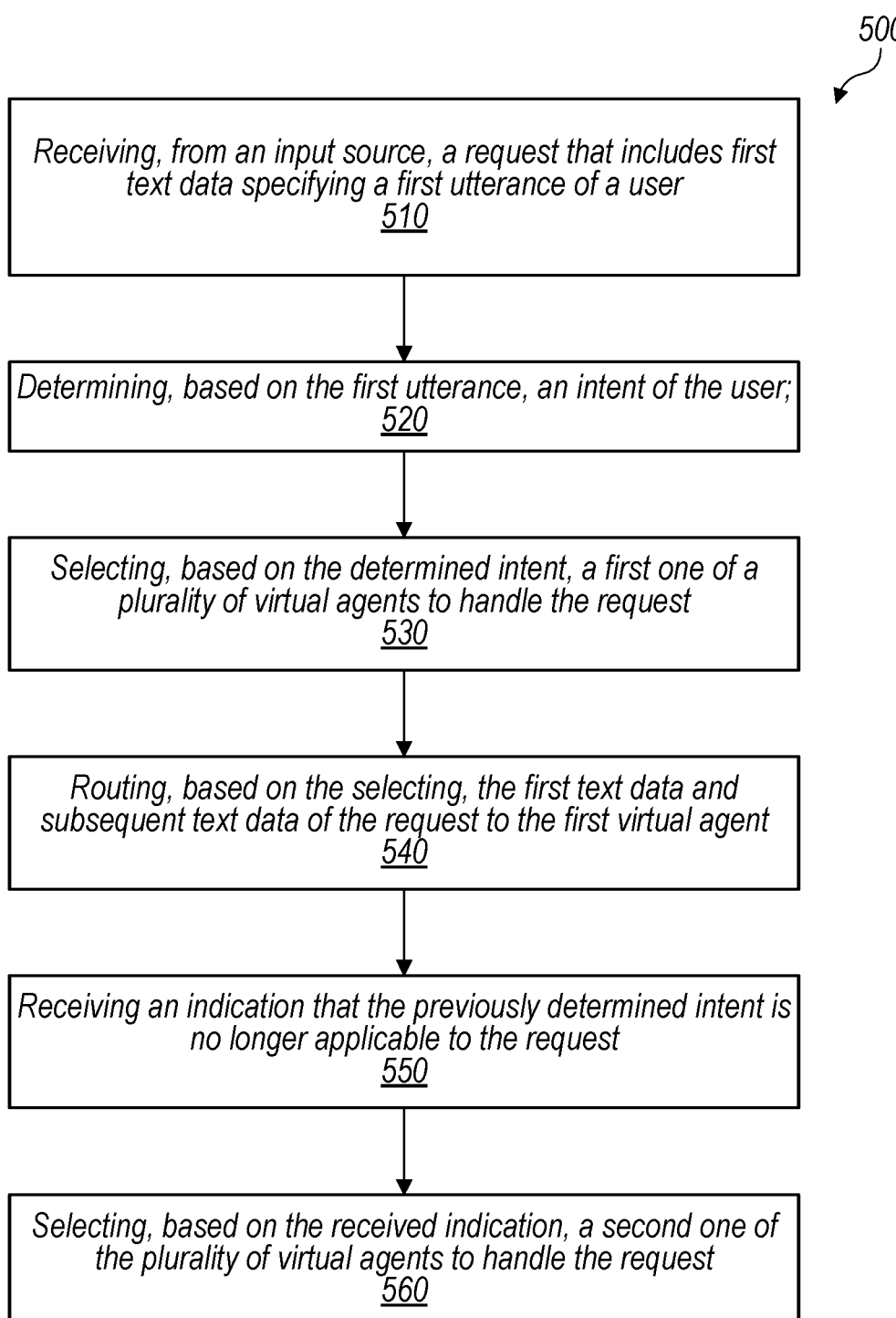

*500*

Receiving, from an input source, a request that includes first
text data specifying a first utterance of a user
510

Determining, based on the first utterance, an intent of the user;
520

Selecting, based on the determined intent, a first one of a
plurality of virtual agents to handle the request
530

Routing, based on the selecting, the first text data and
subsequent text data of the request to the first virtual agent
540

Receiving an indication that the previously determined intent is
no longer applicable to the request
550

Selecting, based on the received indication, a second one of
the plurality of virtual agents to handle the request
560

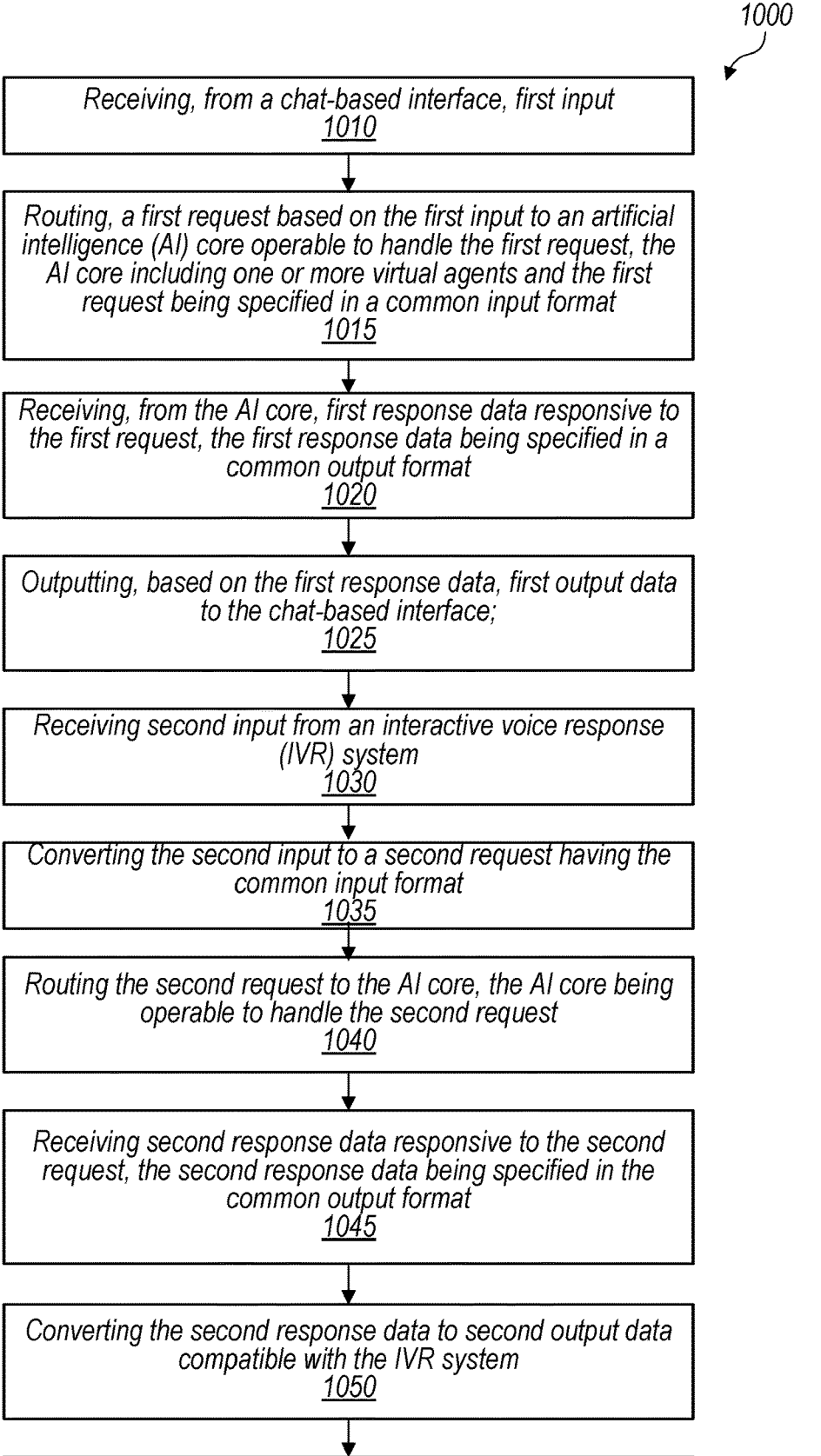

Receiving, from a chat-based interface, first input
1010

Routing, a first request based on the first input to an artificial intelligence (AI) core operable to handle the first request, the AI core including one or more virtual agents and the first request being specified in a common input format
1015

Receiving, from the AI core, first response data responsive to the first request, the first response data being specified in a common output format
1020

Outputting, based on the first response data, first output data to the chat-based interface;
1025

Receiving second input from an interactive voice response (IVR) system
1030

Converting the second input to a second request having the common input format
1035

Routing the second request to the AI core, the AI core being operable to handle the second request
1040

Receiving second response data responsive to the second request, the second response data being specified in the common output format
1045

Converting the second response data to second output data compatible with the IVR system
1050

Sending the second output data to the IVR system
1055

*FIG. 10*

CONVERSATIONAL ARTIFICIAL INTELLIGENCE PLATFORM

CROSS REFERENCE TO RELATED APPLICATION

This application is related to the following U.S. applications: U.S. Provisional application Ser. No. 18/474,905, filed on the same day as the present application.

BACKGROUND

Technical Field

This disclosure relates generally to artificial intelligence systems, and in some embodiments, to scaling conversational systems to support an arbitrary number of virtual agents and input types.

Description of the Related Art

Knowledge bases serve as centralized repositories of information and are frequently employed in customer service and support.

Software has become an increasingly popular channel for accessing knowledge bases and providing user assistance. Such software is capable of receiving input from users and in response, providing information or performing relevant actions. Applicant recognizes that technical challenges exist in providing automated user access to robust and flexible knowledge and functionality, particularly in the context of chatbots, as explained further below relative to various embodiments.

BRIEF DESCRIPTION OF THE DRAWINGS

FIG. 5 is a flow diagram illustrating one embodiment of a method for virtual agent scalability.

FIG. 10 is a flow diagram illustrating one embodiment of a method for input source scalability.

DETAILED DESCRIPTION

Figure 1:
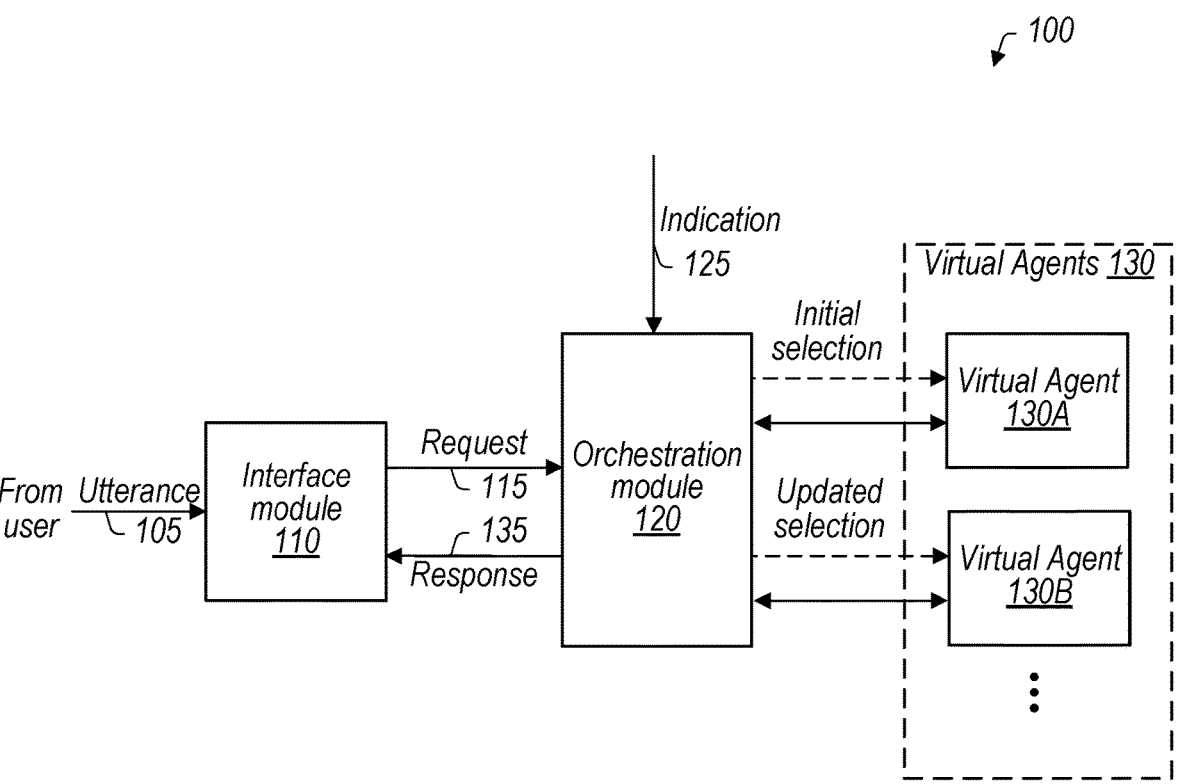
FIG. 1 is a block diagram of one embodiment of a system for virtual agent scalability.

The software modules used to provide assistance to users in accessing knowledge bases can generally be referred to as virtual agents. As used herein, a "virtual agent" is any type of software that receives user input, accesses a knowledge base or other data source, and returns support or assistance to the user. Virtual agents may take various forms depending on the type of support and interaction they provide to users. For example, a virtual assistant (e.g., APPLE SIRI, AMAZON ALEXA) is a type of virtual agent that mimics a human assistant to perform a range of services. Other examples of virtual agents include chatbots and pedagogical agents (e.g., DUOLINGO). Note that different types of virtual agents often overlap in features and may thus be referred to differently depending on the context. For example, a "virtual assistant" is often interchangeably called an "intelligent agent." Virtual agents may be implemented using a variety of technologies that improve interaction with the user such as NLP, machine learning, deep learning, dialog management, etc. Furthermore, virtual agents are capable of performing skills that enable various services such as user assistance, information provision, transaction management, account management, healthcare, education, travel, shopping, IT troubleshooting, etc. For example, a virtual agent may have a "remove phone number" skill that removes a given user's phone number from his or her profile.

Virtual agents are sometimes embedded in graphical user interfaces (GUIs) that enable communication between the user and a virtual agent instance. For example, a webpage may display an interactive UI with a text box that forwards inputs from a user to the virtual agent instance and causes the virtual agent instance to perform one or more skills based on the user input. But limitations to functionality and software architecture manageability arise when only one given virtual agent instance is capable of being embedded in a given GUI, such as, for example, a website that displays a text-based GUI for communicating with a virtual agent instance that supports only a single virtual agent instance during user interaction.

But as the number of features offered by enterprises increases, so does the number of virtual agent skills needed to adequately support those offerings. To accommodate a diverse and growing set of skills, one approach is to implement all of them as part of a single, monolithic, virtual agent instance. For example, a healthcare provider might develop and deploy one virtual agent that both responds to generic frequently asked questions and manages confidential patient data, despite the vast differences in these skills (e.g., in terms of privacy implications).

Developing a monolithic virtual agent that performs all required skills (i.e., various teams implementing dozens of skills for one virtual agent) may lead to several scalability and modularity problems, however. First, software development teams implementing different skills on a single virtual agent would likely all have to be utilizing the same software development process (e.g., a common version control system), which can be problematic in some scenarios. Second, adding new skills to an existing virtual agent might require testing not only the skill itself, but also the skill against all other teams' skills. This adds considerable testing and debug time and could significantly increase the size of the codebase associated with a given virtual agent. Third, while each skill development team would normally have its own development schedule, using a single virtual agent methodology might force synchronization of release schedules across teams. Fourth, use of a single virtual agent often necessitates selection of a single associated platform (e.g., GOOGLE DIALOGFLOW, AMAZON LEX, IBM WATSON ASSISTANT), which in turn frequently dictates the use of a particular AI model. But certain skills might be better implemented if not limited to the resources of a particular development platform (e.g., using GPT for chatbots, BERT for search engine applications, etc.). Finally, having too many skills that access different types of data can raise issues relating to data isolation and privacy.

Using separate monolithic virtual agent instances may be a possible solution to the challenges listed above. Under such an approach, separately implemented virtual agent instances would be unable to communicate with each other during a single user session, negatively affecting user experience. If each virtual agent were to perform a separate skill, a user who wants to perform both skills may have to authenticate to communicate with a first monolithic virtual agent, then re-authenticate to communicate with the second monolithic virtual agent without benefiting from already-extant authentication.

The inventors have recognized the need to enable teams to scalably develop virtual agents and skills while still providing a seamless user experience. This specification includes various embodiments for "federating" virtual agents using a Conversational Artificial Intelligence (CAI) orchestrator that manages communication to, from, and between different virtual agents. For a given user input, the orchestrator agent receives a request and determines the user's intent. Then, the orchestrator routes the request to the appropriate virtual agent based on the intent (instead of having the virtual agent directly receive it from the user). The orchestrator receives a response from the virtual agent, and routes that response back to the user. During the request, the CAI orchestrator can carry session data across multiple virtual agents. For example, the orchestrator may decide to route, from a first agent to a second virtual agent, 1) the request itself and 2) all the previous data involved with communication with the first virtual agent.

Additionally, the paradigm of federated virtual agents allows the user to access different virtual agents during a single session. In some cases, there may need to be a change in virtual agents during a session. Such a change can take the form of a digression or a transfer. As used herein, a "digression" occurs when the currently determined intent is no longer applicable to the request according to some embodiments. Digression can come in two forms: one in which it is determined that the user's intent was incorrectly determined in the first instance, and one in which it is determined that the user's intent has changed.

A "transfer," on the other hand, occurs when there is a change in virtual agent without a change in intent. One type of transfer can occur where the intent is determined correctly, but a selected virtual agent determines, through further interaction, that the skill(s) need to continue the transaction reside on another virtual agent. For example, an itinerary virtual agent may receive a user's request for a complete travel itinerary (e.g., "I'd like a cheap and warm weather holiday on the second week of December"). The itinerary virtual agent may generate the itinerary's dates and locations, but determine that the itinerary requires booking flights, a skill the itinerary virtual agent does not possess.

Accordingly, the itinerary virtual agent causes a transfer of the user's request to a flight reservation virtual agent that uses its own skill(s) to book flights based on the itinerary agent's generated dates and locations.

A similar type of transfer can occur when a determination can be made (such as by an orchestrator) at the outset that a particular request requires a sequence of virtual agents to complete. For example, a determined intent might map to such a sequence. In such a case, the orchestrator may route the request from one virtual agent to another without interruption or loss of data in order to handle a complex request, thereby resulting in a daisy-chain of requests. For example, consider a user's request to fill an organization's form (e.g., "I'd like to fill and sign form 1468E for my employee"). The orchestrator might determine that a sequence of three virtual agents is required to properly complete that particular form: 1) a biographical data virtual agent that inserts the user's biographical information (and asks the user for confirmation) in the form, 2) an organization data virtual agent that inserts the organization's information (e.g., IDs of other employees) in the form, and 3) a secure signing virtual agent that allows the user to electronically sign the filled user form using a secure signature platform.

Note the difference between a transfer and a digression. While both cause a change in the selected virtual agent, that change is interpreted differently by the CAI orchestrator. A transfer involves no change in the user's intent: the request was correctly routed to the initially selected agent (which may in some cases partially fulfill the request using its skills), but that agent cannot complete the request and thus routes it to another virtual agent. On the other hand, a digression involves a change in the user's intent, either because of an incorrect determination or a change in the user's mind, and thus causes the resulting change in virtual agent. Thus, a transfer will cause a change in the selected virtual agent (but no change in the intent as it was correctly determined), while a digression will cause a change in both the selected virtual agent and the determined intent.

FIG. 1 illustrates one embodiment of a system 100 for virtual agent scalability. As shown, system 100 includes an interface module 110, orchestration module 120, and virtual agents 130. Orchestration module 120 initially, in response to an utterance 105, selects a virtual agent 130A, then updates that selection to virtual agent 130B based on an indication 125.

Interface module 110, in various embodiments, handles communication between the user and orchestration module 120. First, interface module 110 receives an utterance 105 from a user. As used herein, an "utterance" refers to a statement made by the user to a given virtual agent, which serves as the input for communication and interaction between the user and the given virtual agent. Such a statement may be verbal, written text, and/or may include other user input as well, e.g., an interaction with a user interface element, a physical gesture, and may have accompanying contextual data about the user, an account of the user, a location of the user, etc. Then, interface module 110 sends a request 115 to orchestration module 120, where request 115 includes text data specifying utterance 105. After a given virtual agent has received and handled request 115, interface module 110 receives a response 135 based on request 115. In some embodiments, the user uses a web-based chat client to send utterance 105 to interface module 110, and in return receives messages relevant to utterance 105 via response 135. Note that the format of utterance 105 is not limited to text. For example, utterance 105 may be a voice input provided by an interactive voice response (IVR)

system. In that scenario, interface module 110 may, instead of directly routing utterance 105 to orchestration module 120, convert voice input from the user to a request 115 compatible with orchestration module 120, as is discussed in more detail with respect to FIGS. 6-10.

Orchestration module 120, in various embodiments, routes information received from a user via interface module 110 to one or more of virtual agents 130. As shown, orchestration module 120 receives a request 115 that includes data specifying utterance 105 from interface module 110. As will be discussed with respect to FIGS. 3A-C, orchestration module 120 may determine an intent of the user based on utterance 105. Then, orchestration module 120 makes, based on the determined intent, an initial selection (indicated by the dashed line) of a virtual agent 130A to handle request 115. Orchestration module 120 then routes, based on the initial selection, the first text data of request 115 and subsequent text data to virtual agent 130A. Then, orchestration module 120 returns a response 135 to interface module 110 and responds to the user.

Orchestration module 120 may select a different virtual agent than the one initially selected based on a change in intent. As shown, orchestration module 120 receives an indication 125 that the previously determined intent is no longer applicable to request 115, and subsequently makes, based on the indication, an updated selection of virtual agent 130B, as indicated by the dashed line. Example changes in virtual agent selection are described in more detail with respect to FIGS. 4B-C.

Note that indication 125 may be generated by various software entities (e.g., user input, virtual agents 130). For example, orchestration module 120 may receive indication 125 from the user. In other embodiments, orchestration module 120 receives indication 125 from a virtual agent, as will be discussed in more detail with respect to FIG. 2.

To recap, system 100, via orchestration module 120, enables scalability of virtual agents while still providing a seamless user experience. Orchestration module 120 enables each virtual agent to be independently developed by handling coordination between different virtual agents and selecting virtual agents according to user intent. This paradigm is an alternative to monolithically developing a single (potentially unwieldy) virtual agent. Furthermore, orchestration module 120 enables the use of multiple separate virtual agents in a single session without interruption to the user. For example, a particular user would not experience interruption of service or data loss due to indication 125 causing a change from one virtual agent 130 to another.

As used herein, a collection of code of an AI platform that implements the logic of an AI system (such as system 100) having a common input/output format is referred to as a single "AI core." In the context of FIG. 1, orchestration module 120 and virtual agents 130, which have an I/O format defined by interface module 110, can be referred to as belonging to a single AI core. Embodiments of system 100 are possible in which there are multiple AI cores—for example, there might be two interface modules 110, each coupled to a different type of input device (e.g., a chatbot and a telephony-based system); two orchestration modules 120; and two sets of virtual agents 130.

Figure 2:
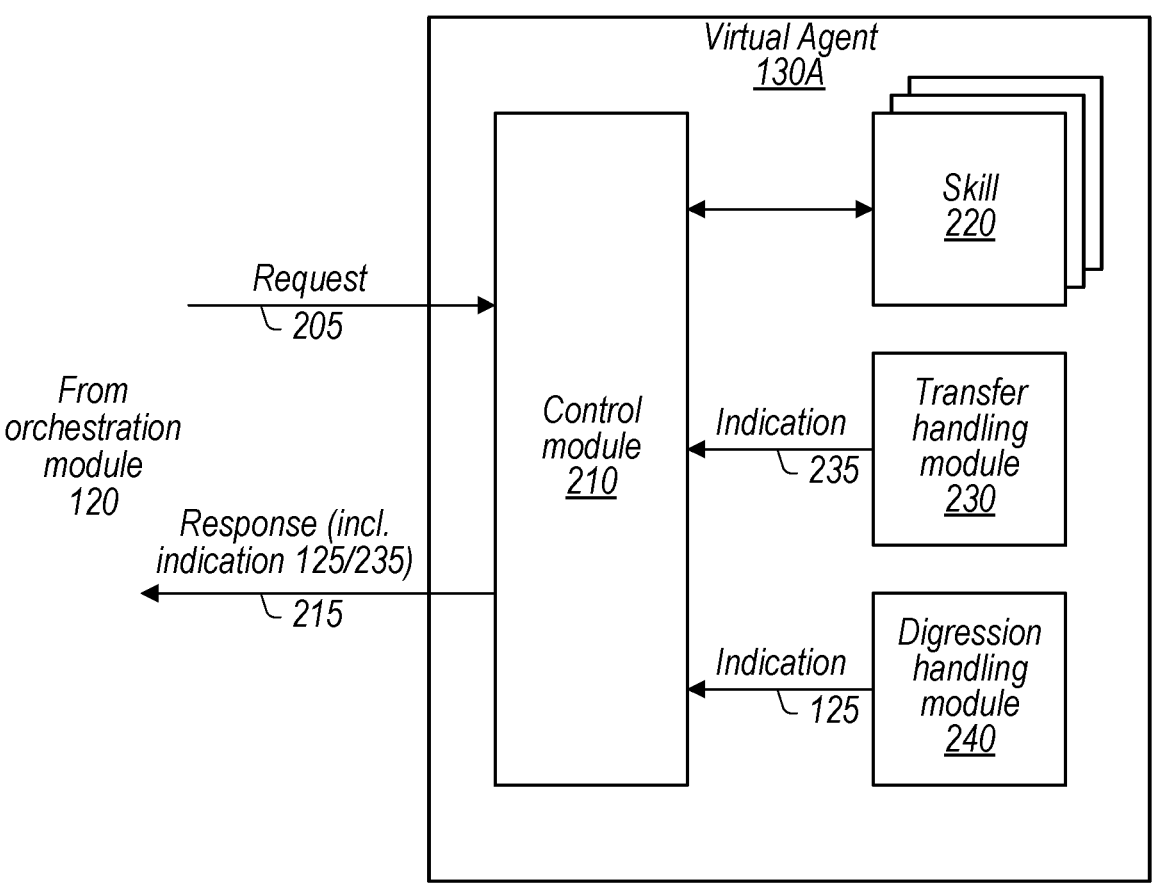
FIG. 2 is a block diagram illustrating one embodiment of a virtual agent.

FIG. 2 is a block diagram of an example virtual agent 130A. As depicted, virtual agent 130A comprises a control module 210, skill 220, transfer handling module 230, and digression handling module 240. Virtual agent 130 may be a chatbot, a virtual assistant, an intelligent agent, or any other software operable to provide user assistance.

Control module 210, in various embodiments, coordinates communication between the virtual agent and other parties. As shown, control module 210 receives request 205 and returns a response 215 according to request 205. More specifically, control module 210 may use request 205 to select skill 220, transfer handling module 230, or digression handling module 240 and then generate response 215 based on request 205.

Request 205 may include any data from utterance 105 and request 115 (neither of which is shown). For example, request 205 may include utterance 105 itself. In some embodiments, request 205 also includes an inferred intent of utterance 105 (e.g., inferred by orchestration module 120) and a confidence score of the inference. As will be discussed below, virtual agent 130 may, according to the contents of request, use one or sub-modules of virtual agent 130A (e.g., skill 220, transfer handling module 230, digression handling module 240).

Skill 220, in various embodiments, is code executing as part of virtual agent 130A to perform a particular task based on request 205. Consider an example scenario where a virtual agent is tasked with modifying user profile information. In that scenario, the virtual agent receives a request 205 based on the utterance "can you add the phone number (888) 221-1161 to my profile?" Then, control module 210 receives the question and routes its data to skill 220, which in turn communicates with an external account management server to accordingly modify user information and include the requested phone number. Note that a virtual agent 130A may implement more than one skill. An example interaction that uses a skill 220 is discussed in more detail with respect to FIG. 4A.

But in some cases, virtual agent 130A may determine a change in virtual agent, and accordingly send an indication that causes the selection of another virtual agent. In that case, virtual agent 130A subsequently sends (via control module 210) a response 215 that includes an indication 125/235 (depending on whether there is a digression or a transfer) that causes a selection of another virtual agent. In some cases, response 215 may also include information about the other virtual agent, such as an identifier of the newly selected virtual agent. As noted, virtual agent 130A may cause either a transfer (via transfer handling module 230) or a digression (via digression handling module 240) depending on request 115.

Transfer handling module 230, in various embodiments, handles transfers from virtual agent 130A to another virtual agent. For example, consider that the previously described virtual agent may modify only basic biographical information (e.g., name, phone number, email) of a user account. If that virtual agent determines that it needs to also add a social security number to the user account, then it may cause a transfer to another virtual agent that supports (e.g., via another skill) adding sensitive data to an account. To accomplish this, transfer handling module 230 may send, as part of response 215, an indication 235 that the request is to be completed by a different virtual agent than the one initially selected. An example exchange involving a transfer is discussed in more detail with respect to FIG. 4B.

In some cases, a change in virtual agents may be caused by digression handling module 240. Recall that there are two types of digression—incorrect interpretation by the system, and a change in intent from the user. An example of the first type is when a user has supplied an utterance that was wrongly interpreted by orchestration module 120, resulting in selection of an incorrect virtual agent. As an example of the second type, the user may have a change of heart with respect to intent, and explicitly state as such in subsequent utterances (e.g., "I actually want help with something else now.") In some cases, request 205 may further include an intent confidence score associated with a confidence level of the determined intent. Such a score being below a certain threshold may indicate a lack of confidence in the intent prediction; orchestration module 120 may thus use this information in determining that the previously determined intent is no longer applicable to the request. In any of these cases, virtual agent 130A may send, as part of response 215, an indication 125 that the previously determined intent is no longer applicable to the request. An example exchange involving digression is described in more detail with respect to FIG. 4C.

Large enterprises may need hundreds of skills to be developed, which can require a significant codebase. The existence of multiple virtual agents 130 enables different developer groups to write their own virtual agents (each having a respective set of skills). The use of multiple virtual agents thus leads to scalability. As will be described next, orchestration module 120 is operable to manage and route data to and between those multiple virtual agents without compromising user experience.

Figure 3A:
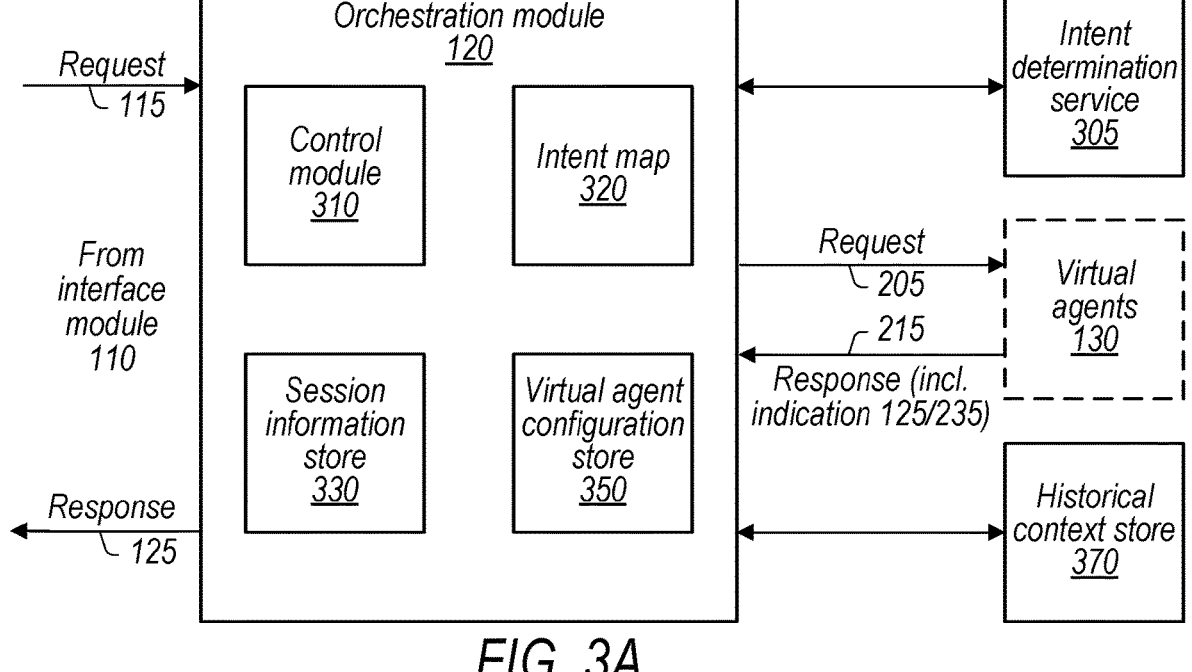
FIG. 3A is a block diagram illustrating one embodiment of a virtual agent orchestrator that handles communication with multiple virtual agents.

FIG. 3A is a block diagram of one embodiment of orchestration module 120 for handling communication with multiple virtual agents 130. As shown, orchestration module 120 includes control module 310, intent map 320, session information store 330, and virtual agent configuration store 350. Furthermore, in various embodiments, orchestration module 120 communicates with virtual agents 130, intent determination service 305, and historical context store 370.

Control module 310, in various embodiments, handles communication between different submodules of orchestration module 120 and with external components such as interface module 110, virtual agents 130, intent determination service 305, and historical context store 370. Control module 310 may communicate with other modules using application programming interface (API) calls. For example, control module 310 may use an API routine to send POST HTTP requests to virtual agents 130. In some cases, the use of an API standardizes the formats of requests 115 and 205 across input types and virtual agents, enabling scalability and facilitating development.

Intent determination service 305, in various embodiments, determines the intent of an utterance using models such as Bidirectional Encoder Representations from Transformers (BERT) or Pathways Language Model (PaLM). Depending on the technology and configuration of intent determination service 305, the inferred intents may be encoded as strings (e.g., "change phone number"). For example, intent determination service 305 may receive an input of "I want to change my phone number" and return an inferred intent such as "change phone number." Alternatively, the inferred intents may be received from intent determination service 305 as intent embeddings, which are vector (i.e., numerical) representations of user intents. In some embodiments, intent determination service 305 may, in addition to the inferred intent, include a confidence score of the inference that is further used in determining whether the intent was correctly inferred. Examples of intent determination service 305 are described in more detail with respect to FIGS. 3C and 4A-C.

Intent map 320, in various embodiments, is a data structure used to select a virtual agent once an intent has been determined. In some embodiments, orchestration module 120 first determines an intent of the user by communicating with intent determination service 305, and then consults intent map 320 to map the determined intent to the appropriate virtual agent 130. An example embodiment of an intent map 320, described in more detail with respect to FIG. 3B. An example virtual agent selection based on an inferred intent is described in more detail with respect to FIG. 3C.

Control module 310 also handles selecting virtual agents and changing the selection from one virtual agent to another based on received requests and indicators from external modules such as virtual agents 130 or intent determination service 305. For example, control module 310 may receive, in response to request 205 to a virtual agent, a response 215 that includes an indication 235 of a transfer from one module to another, and accordingly update session information store 330 to reflect a transfer. Alternatively, control module 310 may receive a response 215 that includes an indication 125 of a digression of the user intent, which causes orchestration module 120 to update session information store 330 to reflect a digression. In some embodiments, orchestration module 120 may further prompt the user (e.g., via a menu) for an additional input that is used by orchestration module 120 to determine a new intent and a corresponding new virtual agent.

As shown, additional components may assist in the operation of orchestration module 120. Virtual agent configuration store 350, for example, includes data identifying each virtual agent 130 capable of receiving a request 205. This information may include virtual agent identifiers, IP addresses, data format requirements for requests 205, or any other data usable to identify, select, and communicate with virtual agents 130. Furthermore, additional services may provide various natural language related features such as translation from one language to another, speech-to-text/text-to-speech, summarization, sentiment analysis, semantics understanding, etc.

Session information store 330, in various embodiments, includes state information indicative of actions taken by virtual agents relative to request(s) 205 and session metadata of current session of orchestration module 120 (e.g., user IDs, IP addresses, session IDs, etc.). State information stored by session information store 330 may include: 1) a state indicator describing the current state of the session (e.g., routed to a virtual agent, processed as part of a digression, processed as part of a transfer, etc.), 2) an identifier of the current virtual agent that requests are being routed to, and 3) the current intent that has been determined by orchestration module 120. Session metadata, on the other hand, may include user identifiers (e.g., user ID, email addresses), IP address, timestamps, session tokens, device identifiers, etc. This session metadata may be used, for example, to query account servers to retrieve and/or modify user account information.

Furthermore, orchestration module 120 may send stored data (e.g., session metadata and state information) of session information store 330 to a newly selected virtual agent, advantageously providing a more seamless user experience. For example, if orchestration module 120 determines that there is a change in virtual agent (either due to a transfer indication 235 or a digression indication 125), data involving the original virtual agent will be accessible to the updated virtual agent, allowing the new virtual agent to "take over" the request with preserved user data.

Historical context store 370, in various embodiments, may store data of session information store 330 across multiple sessions. For example, consider a user communicating with a chatbot using an Internet browser, but has mistakenly ended the session by closing the browser. Since that session data had been saved in historical context store

370, the user may open the browser again and pick up the chatbot interaction without losing progress made during the previous session. Note that while historical context store 370 is depicted as being stored externally with respect to orchestration module 120, it may be instead stored as part of orchestration module 120.

Consider the following example of the operation of orchestration module 120. Control module 310 receives a request 115 that includes an utterance. Then, control module 310 communicates with intent determination service 305 to receive an intent that is used to query intent map 320 and accordingly select a virtual agent 130. Control module 310 modifies session information store 330 to specify that the session is active, and which particular virtual agent has been selected. Then, control module 310 continuously routes inputs to the selected virtual agent and saves session data in historical context store 370. Once control module 310 receives, from the selected virtual agent 130, an indication 125 that the intent is no longer applicable to request 115, it updates session information store 330 to indicate a digression and specify the updated virtual agent. Then, control module 310 retrieves identifiers of the newly selected virtual agent using virtual agent configuration store 350, and subsequently routes all subsequent requests and data from session information store 330 to that virtual agent. More detailed examples are depicted with respect to FIGS. 4A-C.

Figure 3B:
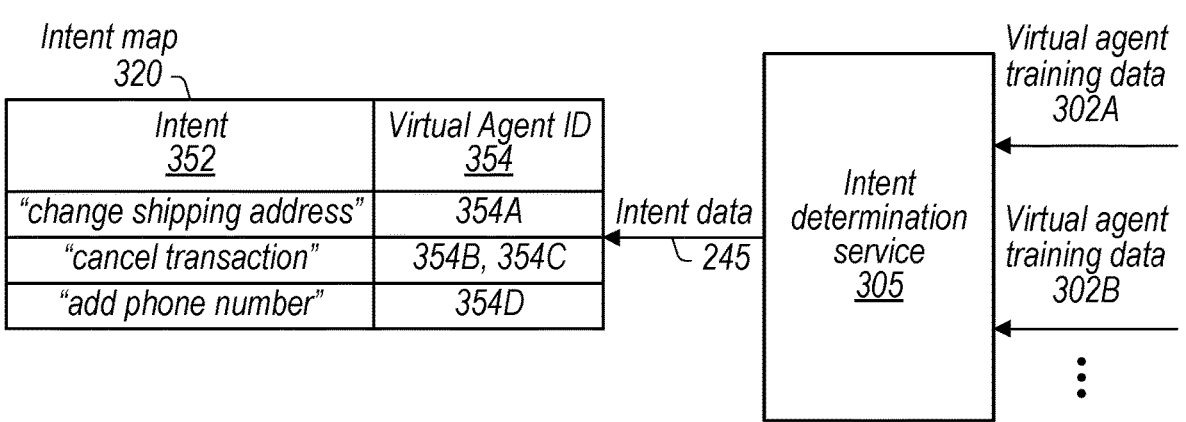
FIG. 3B is a block diagram illustrating one example of population of an intent map.

FIG. 3B is a block diagram illustrating an example of populating of intent map 320. In the depicted embodiment, intent map 320 is populated by training intent determination service 305 with input virtual agent training data 302. Then, intent determination service 305 outputs intent data 245 that includes intents 352 associated with respective virtual agents of IDs 354. Intent map 320 may thus be used to map input intents to corresponding virtual agents.

Populating intent map 320 begins by inputting virtual agent training data 302. In some embodiments, developers of each virtual agent include, as part of training data 302, utterances they assume that users will use to query virtual agents of the system. This causes service 305 to associate the resulting inferred intents 352 with a virtual agent ID 354 of their respective virtual agent. For example, developers of an "account information" agent with a first ID 354M may include "I'd like to change my shipping address" and "please change my phone number" in first virtual agent training data 302A. On the other hand, developers of a "dispute resolution" agent with a second ID 354N may include "I'd like to cancel my order" and "I'd like to return a defective item" in second virtual agent training data 302B.

Once intent determination service 305 receives virtual agent training data 302, it outputs intent data 245 to populate intent map 320. In some embodiments, intent determination service 305 may output, for each virtual agent ID 354 with corresponding virtual agent training data 302, a set of inferred intents based on that virtual agent training data 302. In that case, an inferred intent of "change shipping" address would cause a mapping to a virtual agent with virtual agent ID 354A, while an inferred intent of "add phone number" would cause a mapping to virtual agent with ID 354D. An example use of intent map 320 is discussed in more detail with respect to FIG. 3C.

As shown, intent map 320 also includes a given entry that maps an intent ("cancel transaction") to a sequence of several virtual agents with IDs 354B and 354C. Entries that have similar sequences are interpreted by control module 310 as corresponding to requests that are completed by a sequence of virtual agents, as opposed to a single virtual agent. Entries including a sequence of virtual agent IDs 354 thus allow a pre-determined transfer of virtual agents without having to involve the virtual agents in determining the transfer destination.

Figure 3C:
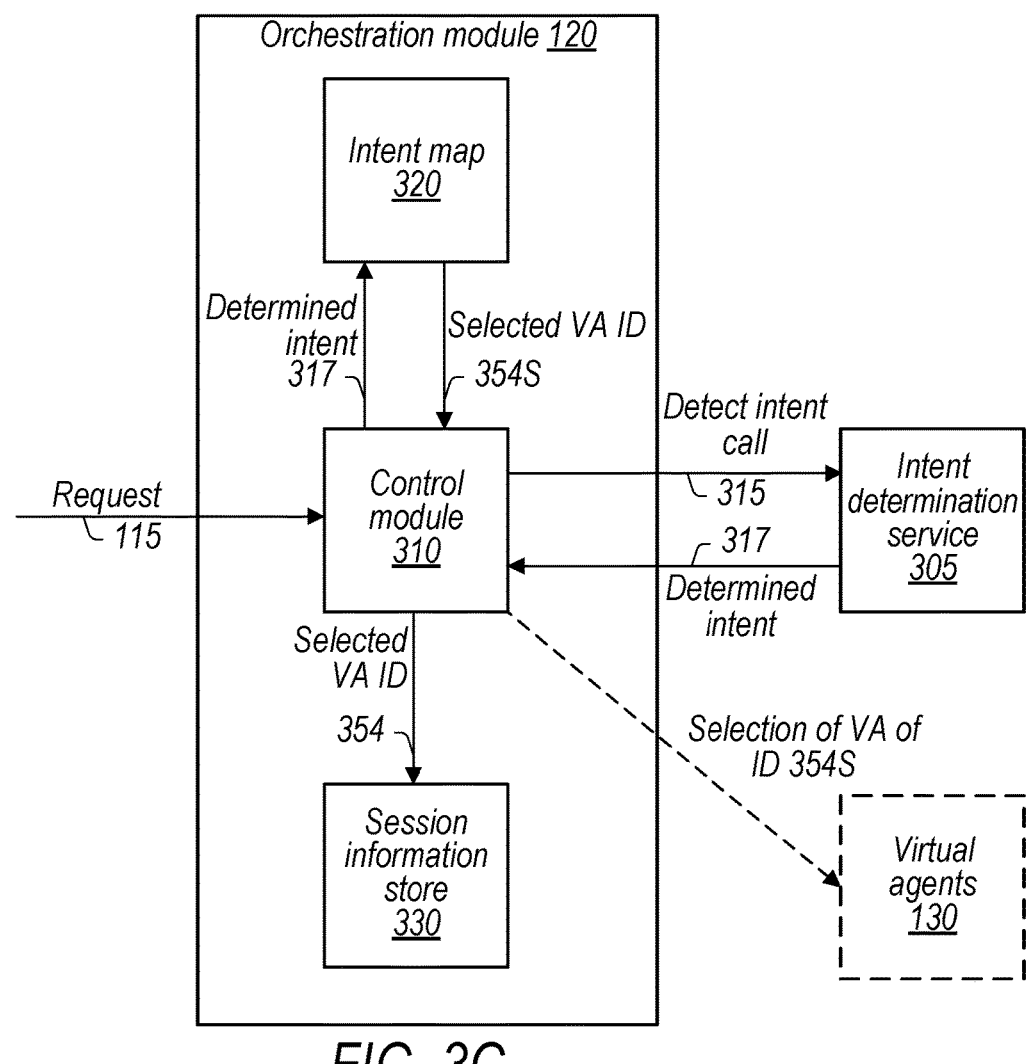
FIG. 3C is a block diagram illustrating one example of virtual agent selection based on a determined intent and an intent map.

FIG. 3C is a block diagram illustrating an example virtual agent selection based on a determined intent 317 of request 115 using intent map 320. In the depicted example, control module 310 performs a lookup operation on intent map 320 to retrieve a virtual agent ID 354S corresponding to the selected virtual agent.

As shown, control module 310 receives request 115 and uses it in a detect intent call 315 to intent determination service 305. Then, control module 310 receives, in response to detect intent call 315, a determined intent 317 from intent determination service 305. Then, control module 310 uses determined intent 317 to index intent map 320, receiving in return a selected virtual agent having ID 354S. Finally, control module 310 selects the virtual agent corresponding to selected ID 354S, updates session information store 330, and routes subsequent requests to the agent having ID 354S. In some embodiments, intent determination service 305 returns additional information such as the confidence score of the intent detection. In other embodiments, orchestration module 120 internally handles determining the intent, as opposed to forwarding detect intent calls 315 to intent determination service 305.

As has been noted, intent map 320 may include one or more entries that describe a mapping of a given intent (e.g., "cancel transaction") to a given sequence of virtual agents (e.g., 354B and 354C) such that each corresponding virtual agent in the sequence completes a portion of request 115. For example, if orchestration module 120 receives a request 115 that results in retrieving the sequence of virtual agents, control module 310 may first route, based on the sequence of virtual agents, the request to the virtual agent with ID 354B. When the virtual agent of ID 345B completes its respective portion of the request, control module 310 routes the request to the virtual agent with ID 345C (i.e., the next virtual agent in the sequence). Longer sequences may also be included in intent map 320.

Other techniques may be used. For example, control module 310 may reroute determined intent 317 to a classifier trained using virtual agent training data 302 that classifies the intent into an appropriate virtual agent. As another example, in the event that the intent is an embedding, control module 310 may determine a nearest neighbor of determined intent 317 and use that nearest neighbor to access intent map 320. With these basic approaches in mind, various examples of request handling are discussed now with respect to FIGS. 4A-C.

Figure 4A:
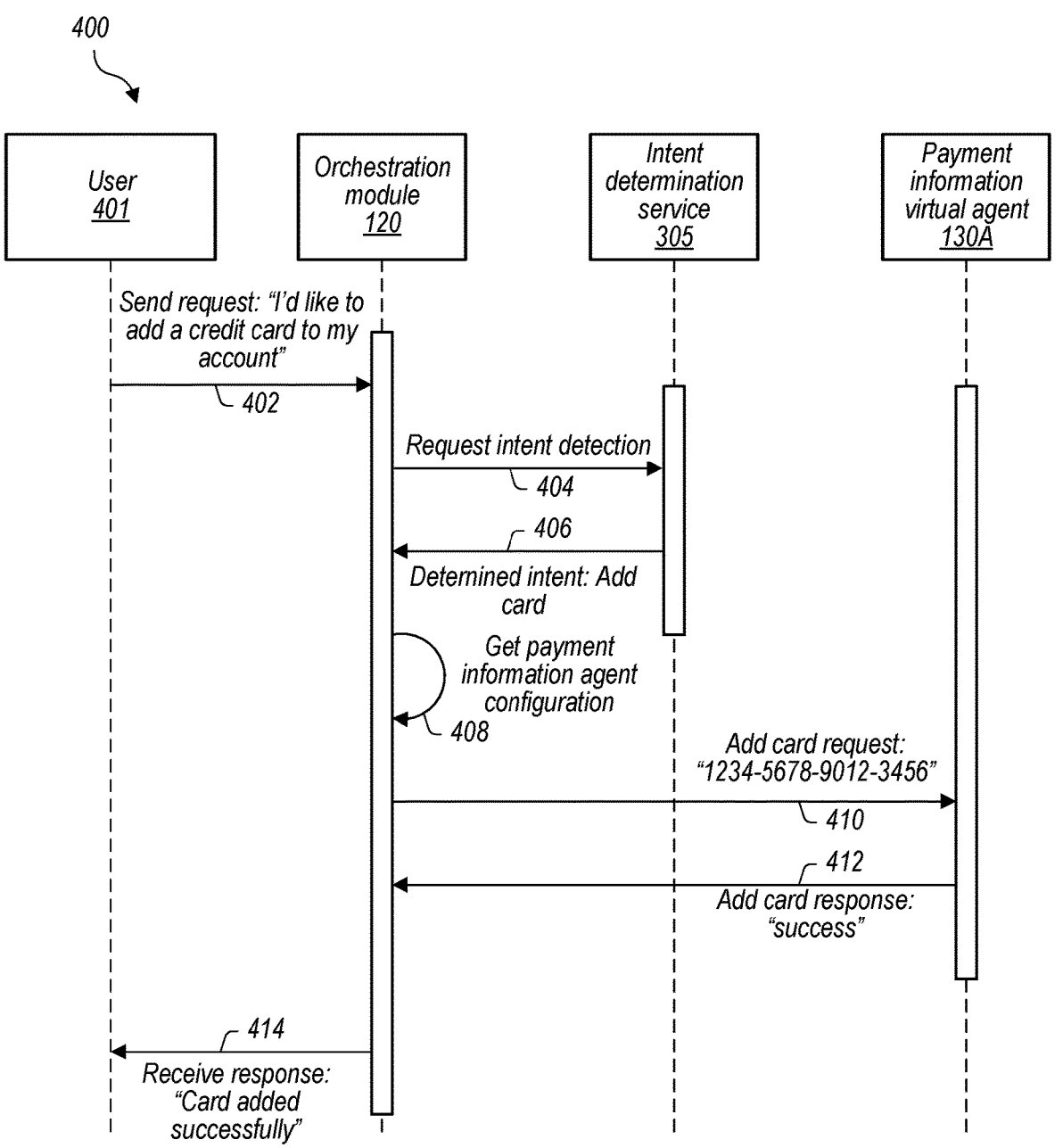
FIG. 4A is a communication diagram illustrating an example session with no change in the selected virtual agent.

FIG. 4A is a communication diagram of a session 400 in which there is no change in the selected virtual agent. Session 400 is between a user 401 and a payment information virtual agent 130A via orchestration module 120. In the illustrated example, session 400 illustrates the use of a virtual agent skill with no change in the selected virtual agent or the inferred intent. Although this flow could apply to any knowledge base context, session 400 is discussed in the context of an example relating to an ecommerce customer service site.

As shown, session 400 begins at 402 with a user 401 sending a request to orchestration module 120 that specifies "I'd like to add a credit card to my account." In response to receiving the request, orchestration module 120 sends a request for intent detection at 404, which is received by intent determination service 305. Intent determination service 305 returns to orchestration module 120 a determined intent at 406. In this case, the determined intent is "add card." In response, orchestration module 120 determines, selects, and obtains information for a payment information virtual agent 130A at 408. Step 408 may involve orchestration module 120 performing additional operations in FIG. 3 such as using an intent map 320, consulting virtual agent configuration store 350, updating session information store 330 and historical context store 370, etc. Once payment virtual agent 130A is selected, orchestration module 120 sends a request to virtual agent 130A at 410 to add a credit card. This request includes relevant information such as credit card number, security code, credit card expiration date, etc. Once the credit card is added, virtual agent 130A returns a success status indicator to orchestration module 120 at 412. In response to receiving the success status indicator, orchestration module 120 returns, at 414, a message to user 401 indicating the success of the add card transaction.

In other embodiments, session 400 may include further features not shown in FIG. 4A. Virtual agent 130A or orchestration module 120 may ask the user for additional information (e.g., confirmation, a two-factor authentication code, etc.) and may communicate with external servers (e.g., payment processing servers) in the process. In some cases, orchestration module 120 may choose, after step 440 and before concluding session 400, to ask user 401 for feedback. If the user affirmatively responds to the request for feedback, orchestration module 120 routes subsequent inputs to a feedback virtual agent that collects user feedback.

Figure 4B:
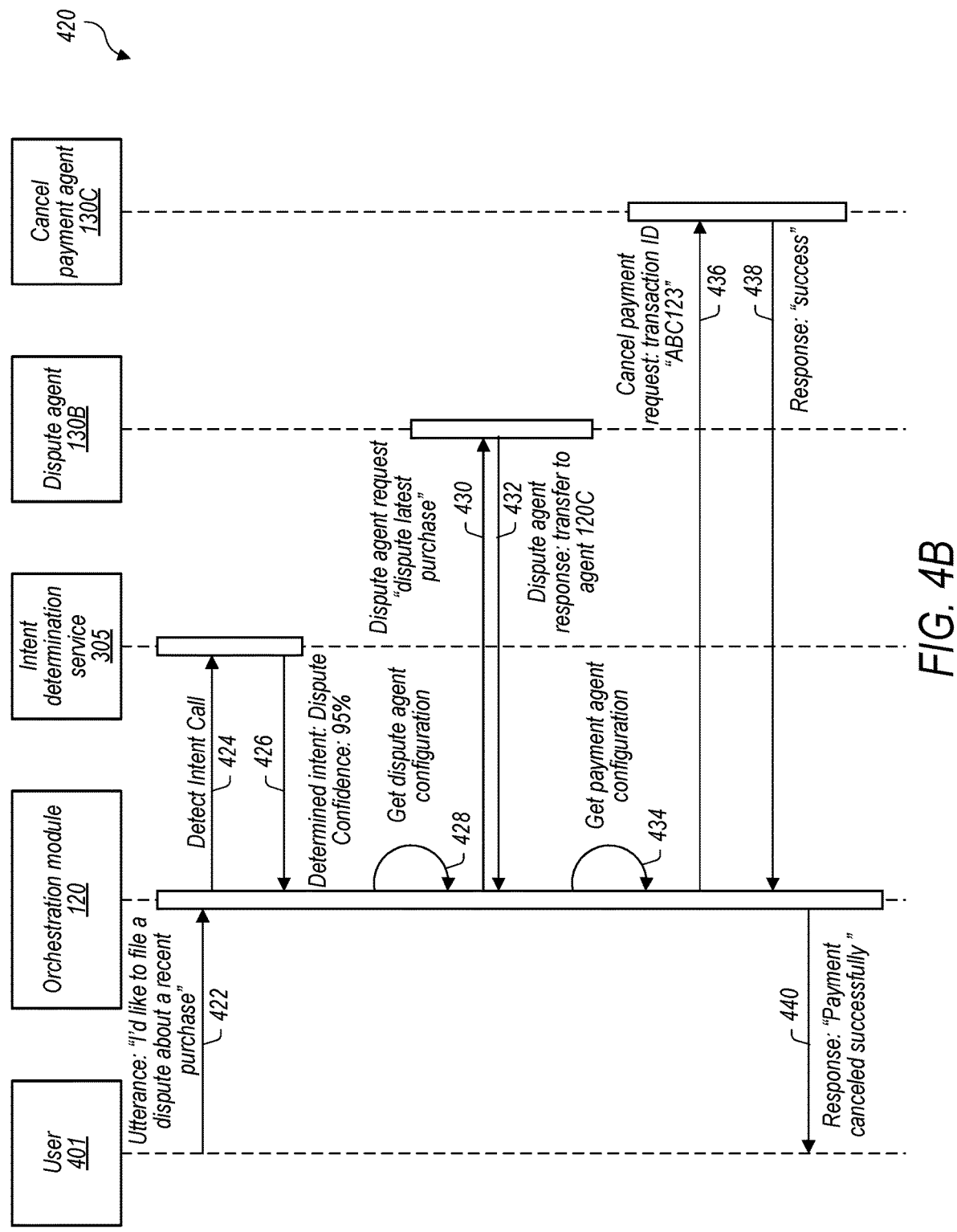
FIG. 4B is a communication diagram illustrating an example session with a change in the selected virtual agent.

FIG. 4B depicts a communication diagram of a session 420 that involves a transfer. As shown, session 420 involves communication between user 401 and virtual agents 130B-C via orchestration module 120. In the illustrated example, session 420 depicts a change from one virtual agent to another without a change in intent. Dispute agent 130B determines that it needs to transfer the request to cancel payment agent 130C because of a related skill that cancel payment agent 130C possesses and agent 130B lacks.

In the depicted example, session 420 begins at 422 with user 401 sending a request to orchestration module 120 specifying "I'd like to file a dispute about a recent purchase." In response to receiving the request from user 401, orchestration module 120 sends a request for intent detection at 424, which is received by intent determination service 305. At 426, intent determination service 305 returns to orchestration module 120 a determined intent specifying "dispute" as an intent and a confidence score of 95% (indicating high confidence). Then, at 428, orchestration module 120 selects, and obtains information for dispute agent 130B based on the received intent and the confidence score.

Once dispute agent 130B is selected, at 430, orchestration module 120 routes data to virtual agent 130B that specifies that the user would like to dispute a recent purchase. In response to receiving the request, dispute agent 130B determines that the skill is to be completed by cancel payment agent 130C. Dispute agent 130B accordingly sends a response indicating a transfer to cancel payment agent 130C at 432. Orchestration module 120 proceeds to update session information store 330 to indicate various statuses of the current session. For example, in this scenario (change in virtual agent with no change in intent), orchestration module 120 may update session information store 330 to indicate that: 1) that there is a change in agent, 2) there is no change in intent, and 3) which new agent is to be selected. Finally, orchestration module 120 sends a request to cancel payment agent 110D to cancel user 401's latest transaction at 436.

After receiving a successful response from agent 130C at 438, module 120 and forwards a message indicating success at 440.

Session 420 may be performed differently in other implementations. For example, user 401 may communicate with orchestration module 120 throughout session 420 for additional input relevant to the session. For example, in some scenarios, dispute agent 130B may present, between steps 430 and 432, a UI menu to the user that allows the user to choose between 1) canceling a payment or 2) initiating a purchase return. (Both possible scenarios are in the context of a dispute, and neither option would thus be considered a change in the initially determined intent of "dispute latest purchase.") In the example described in this figure, the user would provide information specifying a cancellation (instead of a return) and causing the transfer from virtual agent 130B to virtual agent 130C without changing the intent of the user. In other cases, the transfer from agent 130B to 130C is caused by orchestration agent 130 determining an intent that maps to a sequence of multiple virtual agents, similar to the "cancel transaction" entry of FIG. 3B that includes IDs 340B-C.

Figure 4C:
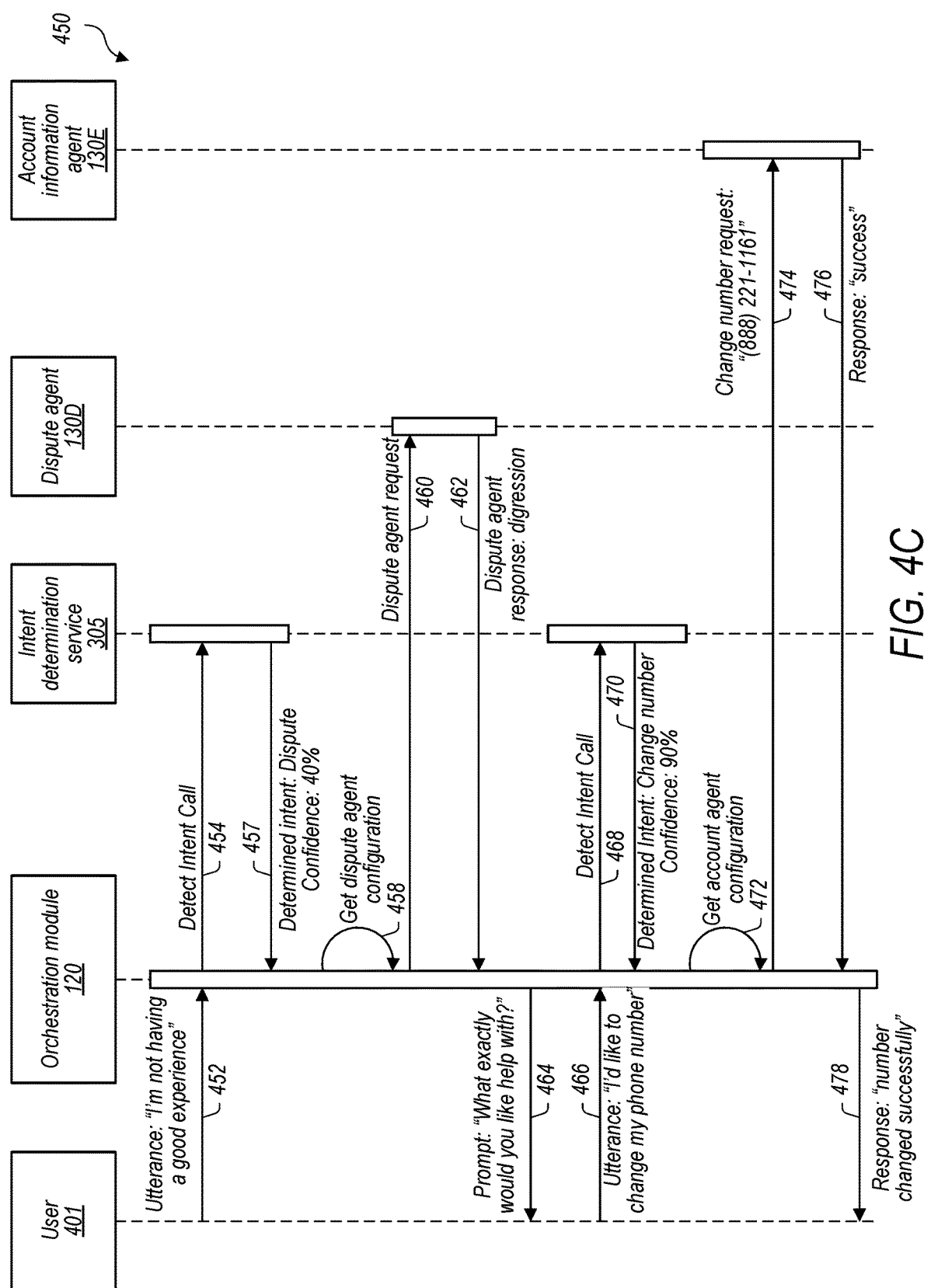
FIG. 4C is a communication diagram illustrating an example session with a change in intent and a change in the selected virtual agent.

FIG. 4C is a communication diagram illustrating a session 450 with a digression. As shown, session 450 has a change in intent and a resulting change in virtual agent. Session 450 is performed between user 401 and virtual agents 130A and 130C via orchestration module 120. In the illustrated example, session 450 depicts a change from one virtual agent to another due to a digression. As will be described below, dispute agent 130B determines a digression and causes a change to cancel payment agent 130C because of an incorrectly determined intent of user 401.

In this example, session 450 begins at 452 with user 401 sending a request to orchestration module 120 whose intent cannot be clearly determined (as indicated by a relatively low confidence score). In response to receiving the request from user 401, orchestration module 120 sends a request for intent detection at 454, which is received by intent determination service 305. Intent determination service 305 returns to orchestration module 120, at 457, a determined intent specifying "dispute" and a confidence score of 40%, which is a relatively low score. Then, at 458, orchestration module 120 determines, selects, and obtains information for a dispute agent 130D based on the received intent.

Orchestration module 120 then sends, at 460, a request to dispute agent 130D along with the confidence score. In response to receiving the request, dispute agent 130D determines, at 452, from the utterance and the confidence score being sufficiently low that there needs to be a change in the selected virtual agent to properly serve the user. Dispute agent 130A accordingly sends a response indicating digression at 462. Orchestration module 120 proceeds to send a digression resolution request to determine an updated utterance from the user at 464. At 466, a digression resolution response is received that can be reinterpreted by orchestration module 120 and used to select a different virtual agent. Orchestration module 120 proceeds to send another intent call at 468 and receive, at 470, an intent that indicates a desire to change a phone number. (In this instance, the associated confidence score is now higher than the one returned at 457.) Orchestration module 120 accordingly selects, at 472, an account information agent 130E that corresponds to the updated intent. Finally, orchestration module 120 sends a request to account information agent 130E to change the user's phone number at 474, receives a response from agent 130C at 476, and forwards a message indicating success at 478.

In some cases, orchestration module 120 may receive, for a single request 115, multiple determined intents and respective confidence scores. As such, orchestration module 120 may rank the determined intents and initially select the intent with the highest confidence score. In the case of a digression due to an indication 125, orchestration module 120 may then select the intent with the next highest confidence score. Once the intent is updated, orchestration module 120 selects, based on the updated intent with the next highest confidence score, another virtual agent for request 115 via intent map 320.

Turning now to FIG. 5, a flow diagram of a method 500 is shown. Method 500 is one embodiment of a method performed by a computer system (e.g., system 100) to support an arbitrary number of virtual agents. Method 500 may be performed by executing a set of program instructions stored on a non-transitory computer-readable medium.

Method 500 begins in step 510 with the computer system receiving, from an input source (e.g., interface module 110), a request (e.g., request 115) that includes first text data specifying a first utterance (e.g., utterance 105) of a user. In some embodiments, the input source is an interactive voice response (IVR) system (e.g., IVR system 630), the first utterance is based on voice input from the user, and the first text data is generated by converting the first utterance to text.

In step 520, the computer system determines, based on the first utterance, an intent of the user. In some embodiments, the determining includes 1) sending to a natural language processing (NLP) service (e.g., intent determination service 305), an intent request (e.g., detect intent call 315) based on the first utterance and 2) receiving, by the computer system from the NLP service in response to the intent request, an intent response that includes the determined intent (e.g., determined intent 317). The intent response may further include a confidence score associated with the determined intent.

Method 500 continues in step 530, where the computer system selects, based on the determined intent, a first virtual agent (e.g., virtual agent 130A) to handle the request.

In some embodiments, the computer system selects the first virtual agent using an intent map. In that case, the computer system may perform a lookup operation (e.g., using determined intent 317) on an intent map (e.g., intent map 320), and accordingly retrieve an identifier (e.g., selected VA ID 354S) of the first virtual agent corresponding to the determined intent. The intent map data structure may include, instead of a single identifier, a sequence of virtual agent identifiers. Accordingly, the intent map data structure may include an entry that describes a mapping of a given intent to a given sequence of virtual agents (e.g., 354B, 354C), such that each virtual agent of the sequence completes a portion of the request. When the computer system performs a lookup that results in retrieving such a sequence, it may first route, based on the sequence of virtual agents, the request to the first virtual agent of the sequence, and then route, based on a previous agent completing its respective portion of the request, the request to the next virtual agent of the sequence, until the request is completed.

Then, in step 540, the computer system routes, based on the selecting, the first text data and subsequent text data to the first virtual agent.

In step 550, the computer system receives (e.g., from virtual agent 130A) an indication (e.g., indication 125) that the previously determined intent is no longer applicable to the request. In some embodiments, the indication is received from the first virtual agent, which has made a determination that the previously determined intent was incorrect. Alternatively, the indication may be received from the input source and specifies a change in intent by the user.

Further, the determination may be based on a confidence score associated with the previously determined intent. The user may participate in resolving the incorrectly determined intent. Accordingly, the computer system may send to the user in response to the determination that the previously determined intent was incorrect. a digression resolution request (e.g., at step 464). Then, the computer system may receive in response to the request, a digression resolution response (e.g., at step 466) that causes the selection of the second virtual agent (e.g., at step 472).

The computer system may receive other indications that result in selecting a different virtual agent. For example, the computer system may receive (e.g., at 432), from the second virtual agent, transfer information indicating that the request is to be completed by a third of the plurality of virtual agents. Then, the computer system may select (e.g., at 434), based on the transfer information, the third virtual agent to complete the request.

Method 500 concludes in step 560, the computer system selects, based on the received indication, a second virtual agent (e.g., virtual agent 130B) to handle the request. In some cases, selecting the second virtual agent is based on the computer system determining that the request requires multiple virtual agents to be completed, including the first and second virtual agents. In some embodiments, the selecting further involves the computer system 1) storing state information indicative of actions taken by the first virtual agent relative to the request and 2) subsequently sending the state information to the second virtual agent.

IVR Transcoder

Virtual agents are typically designed to interact with users through textual input. Accordingly, virtual agents commonly receive text-based queries, commands, or messages from users and provide relevant responses or actions. Due to the architecture and development of current virtual agents, they may not support other inputs such as voice inputs. Voice inputs instead tend to be handled by other technologies such as interactive voice response (IVR) systems.

IVR is a technology that enables automated telephony systems to interact with callers through voice-based inputs. IVR systems use pre-recorded voice prompts and menus to guide callers and collect their responses through spoken words or touch-tone keypad inputs. By utilizing speech recognition and techniques such as dual-tone multi-frequency (DTMF) detection, IVR systems can understand and process caller inputs to provide appropriate information or route them to the appropriate department or service.

Historically, IVR systems have been developed independently of text-based virtual agents. As such, one approach for an enterprise that desires to deliver customer support solutions both via the Web and telephonically has been to separately develop and maintain two different independent systems. The present inventors have recognized the duplicative nature of the current approach, and thus propose a system that allows multiple interfaces to benefit from a single set of virtual agents—i.e., a single AI core.

Described below is a system in which an IVR transcoder integrates an IVR system into an existing virtual agent infrastructure according to various embodiments. In some embodiments, an IVR transcoder may first use text-to-voice (TTV) software to convert a user's voice queries into text utterances that may then be sent to an orchestrator module in a federated approach. Then, the orchestrator routes the utterance to the appropriate virtual agent and returns that virtual agent's text response to the IVR transcoder. Finally, the IVR transcoder uses voice-to-text (VTT) software to convert the text response from text to voice and send it back to the user.

This approach enables the IVR system to benefit from the multiplicity of skills provided by all of the virtual agents instead of having the developers independently develop those same skills for different input sources such as an IVR. Furthermore, the use of AI-powered TTV and VTT techniques may respectively allow for a more natural user interaction thanks to the improved voice response and speech recognition relative to traditional equivalent techniques (e.g., pre-recorded voice prompts, DTMF).

Figure 6:
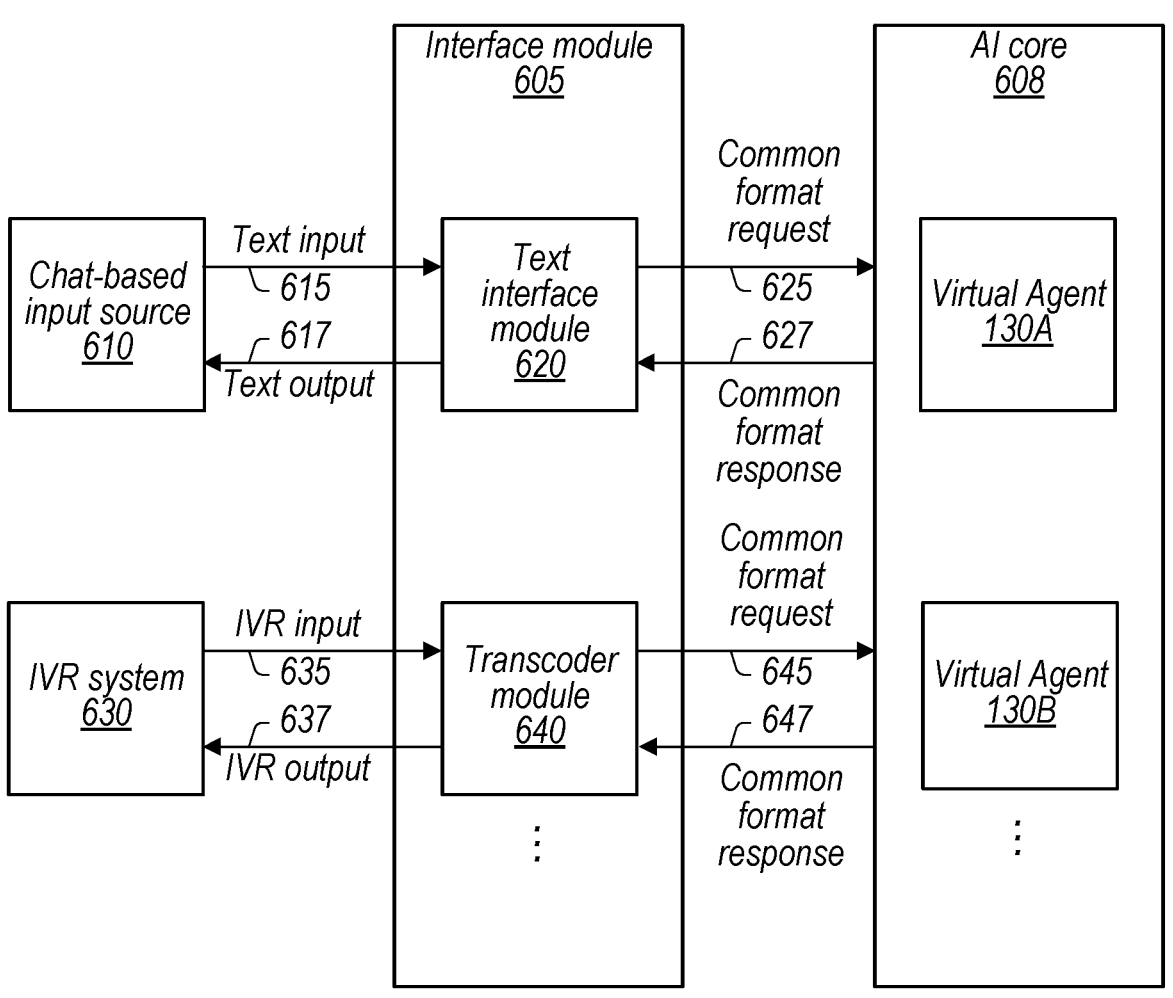
FIG. 6 is a block diagram illustrating one embodiment of a conversational artificial intelligence platform.

FIG. 6 is a block diagram illustrating one embodiment of a conversational AI platform 600. As shown, platform 600 includes chat-based input source 610, IVR system 630, interface module 605, and AI core 608. Interface module 605 in the depicted embodiment includes text interface module 620 and transcoder module 640, while AI core 608 includes a plurality of virtual agents 130A-B. Notably, platform 600 supports the inputs from different sources (e.g., chat-based input source 610, IVR system 630) that have respective interface sub-modules within interface module 605 (text interface module 620, transcoder module 640). Those interface sub-modules in turn convert user inputs into formats compatible with AI core 608.

As shown, AI core 608 is operable to handle requests specified in a common input format and return responses in a common output format. The use of a common input and output format by AI core 608 advantageously allows for a simpler code design, in contrast, for example, to a design in which there is a separate AI core for each possible type of input device (e.g., one core for chat-based input and one core for IVR input). AI core 608 may include more features than depicted. For example, AI core 608 may include an orchestrator module that allows selecting (and switching between) virtual agents 130, as has been discussed above with reference to FIGS. 1-5, and which will be discussed in more detail with respect to FIG. 9.

Chat-based input source 610, in various embodiments, receives user input and sends it as a text input 615 to text interface module 620. Chat-based input source 610 may, for example, be instantiated as a web-based UI rendered in a browser, or as an element of a smartphone application. Typically, text input 615 is an utterance written by a user such as "I'd like to change my phone number," or a question such as "when did I make my last purchase?" Depending on the functionality of the particular virtual agent skill needed by the user, text input 615 may further include other data such as images, videos, etc. Once the request based on text input 615 is fulfilled, chat-based input source 610 receives a text output 617 via interface module 605 such that it can then display a response to the user.

Text interface module 620, in various embodiments, receives text input 615 from chat-based input source 610 and converts it into a common format request 625 supported by AI core 608. In some embodiments, text interface module 620 sends the text input as-is without modification. But in other embodiments, text interface module 620 converts text input 615 into request 625 by performing one or more transformations or techniques (e.g., tokenization, feature extraction, etc.) on text input 615. In either case, text interface module 620 ensures that request 625 is in the common input format before sending it to AI core 608. For example, text interface module 620 may, prior to sending common format request 625 to AI core 608, verify (e.g., via a typecheck) that the data of converted text input 615 is in the common input format.

IVR system 630, in various embodiments, is automated telephony technology that allows users to interact with a computer system using a telephone's keypad (for selections) and/or microphone (for voice commands). As shown, IVR system 630 sends IVR input 635 to transcoder module 640. In some cases, IVR input 635 includes audio data received from the user's telephone microphone and encoded in a particular codec (e.g., G.711, G.729, Opus). But IVR input 635 may instead be text data already transcribed by IVR system 630 using rule-based speech recognition (e.g., Hidden Markov Model (HMM)-Gaussian Mixture Model (GMM) technique). IVR system 630 may also include, as part of IVR input 635, non-voice data such as an indication of one or more key presses made by a telephony device.

Transcoder module 640, in various embodiments, receives IVR input 635 from IVR system 630, converts it into common format request 645, and sends it to AI core 608. In some embodiments, the conversion is performed by transcribing the IVR input into text and then transforming that text into common format request 645 compatible with AI core 608. Once AI core 608 returns a common format response 647, transcoder module 640 converts the response into an IVR output 637 compatible with IVR system 630. Example input and output conversions of module 640 are described in more detail with respect to FIG. 7.

AI core 608, in response to receiving common format requests, further returns common format responses based on respective input requests. In some embodiments, common format responses are sentences generated by a virtual agent to emulate a human assistant. But common format responses may also include other types of text data (e.g., HTML code, formatted text, etc.) and/or data that enables more interaction between the user and the virtual agent. For example, common format response 627/647 may include data for a menu with one or more options for user selection, as is described in more detail with respect to FIG. 8.

Note that platform 600 can have any number of possible input sources. For example, one implementation might include multiple different chat-based input sources 610. Platform 600 can also include one or more voice-activated inputs (e.g., a home assistant device) as well. Whatever the number of possible input sources, components of interface module 605 can ensure that input and output are converted to respective common formats.

Figure 7:
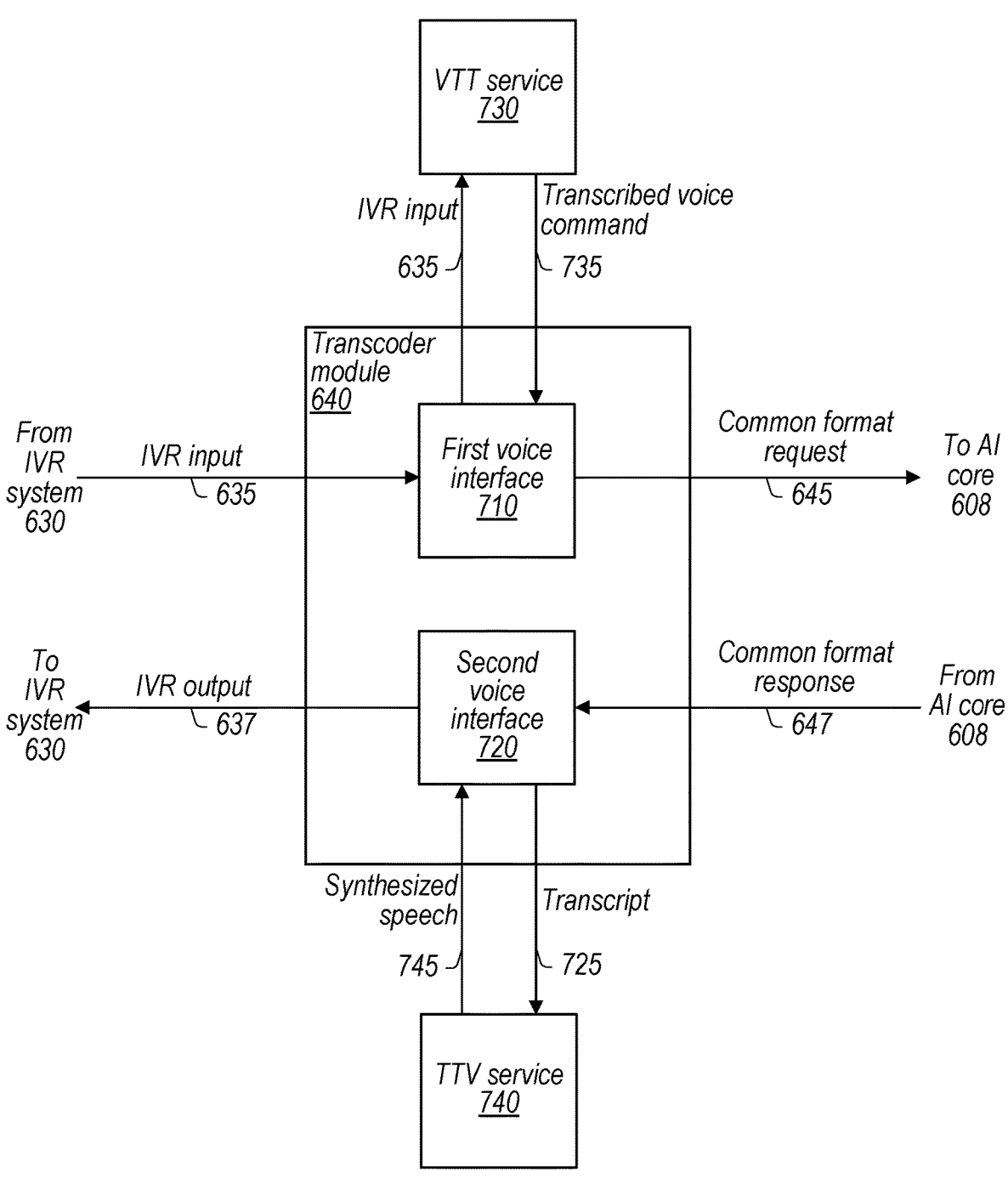
FIG. 7 is a block diagram of one embodiment of a transcoder module.

FIG. 7 is a block diagram of one example of a transcoder module 640 that is operable to transcode voice inputs and outputs between IVR system 630 and AI core 608. As shown, transcoder module 640 includes first and second voice interfaces 710 and 720 and communicates with voice-to-text (VTT) and text-to-voice (TTV) services 730 and 740. Transcoder module 640 serves as an interface that enables IVR system 630 to communicate with AI core 608 by performing conversions where appropriate.

VTT service 730, in various embodiments, is software executable to use any suitable transcription technology. Example transcription technology includes AI-based transcription techniques such as convolutional neural networks (CNNs), recurrent neural networks (RNNs), deep neural networks (DNNs), and long short-term memory (LTMSM). In some embodiments, VTT service 730 is a commercially available system such as Google Cloud™ Speech-to-Text, IBM Watson®, etc.

As depicted, first voice interface 710 receives IVR input 635, which it sends to VTT service 730. Then, VTT service 730 transcribes IVR input 635 into a transcribed voice command 735. After first voice interface 710 receives transcribed voice command 735, it may perform any number of transformations (similar to those made by text interface module 620) on transcribed voice command 735 to convert it into common format request 645 compatible with AI core 608. Note that in some cases, IVR input 635 is not an audio file (e.g., IVR system 630 has already transcribed audio input, IVR input 635 includes key presses, etc.). In those cases, first voice interface 710 still converts IVR input 635 into common format request 645 compatible with AI core 608, but does not interact with VTT service 730.

TTV service 740, in various embodiments, is software that receives text data and synthesizes voice output based on a transcript. The transcript may include the text to be synthesized, but may add other metadata (e.g., voice gender, reading speed, accent, etc.) to customize the output of TTV service 740. TTV service 740 may be based on technologies such as concatenative synthesis, linear predictive coding (LPC), hidden Markov models (HMM), or AI techniques such as waveform generation models, transformer-based models, adversarial learning, etc. TTV service 740 may also be a third-party text-to-speech solution (e.g., GOOGLE CLOUD Text-to-Speech, AWS Polly, etc.).

After transcoder module 640 sends common format request 645 to AI core 608, it receives common format response 647. As shown, second voice interface 720 converts common format response 647 into a transcript 725 that is compatible with TTV service 740. Then, TTV service 740 converts transcript 725 into synthesized speech 745, which is then routed back to IVR system 630 as part of IVR output 637. In some embodiments, transcript 725 is a human-readable text string (e.g., a sentence) that TTV service 740 synthesizes into an audio file. As noted, transcript 725 may include additional directives such as voice type and reading speed. In other embodiments, second voice interface 720 does not communicate with TTV service 740 and instead returns non-audio output that allows IVR system 630 to synthesize speech. For example, second voice interface 720 may convert common format response 647 into an output written in voice extensible markup language (VoiceXML), Javascript, or PHP, which is then relayed to IVR system 630 (instead of TTV service 740) for voice synthesis.

Figure 8:
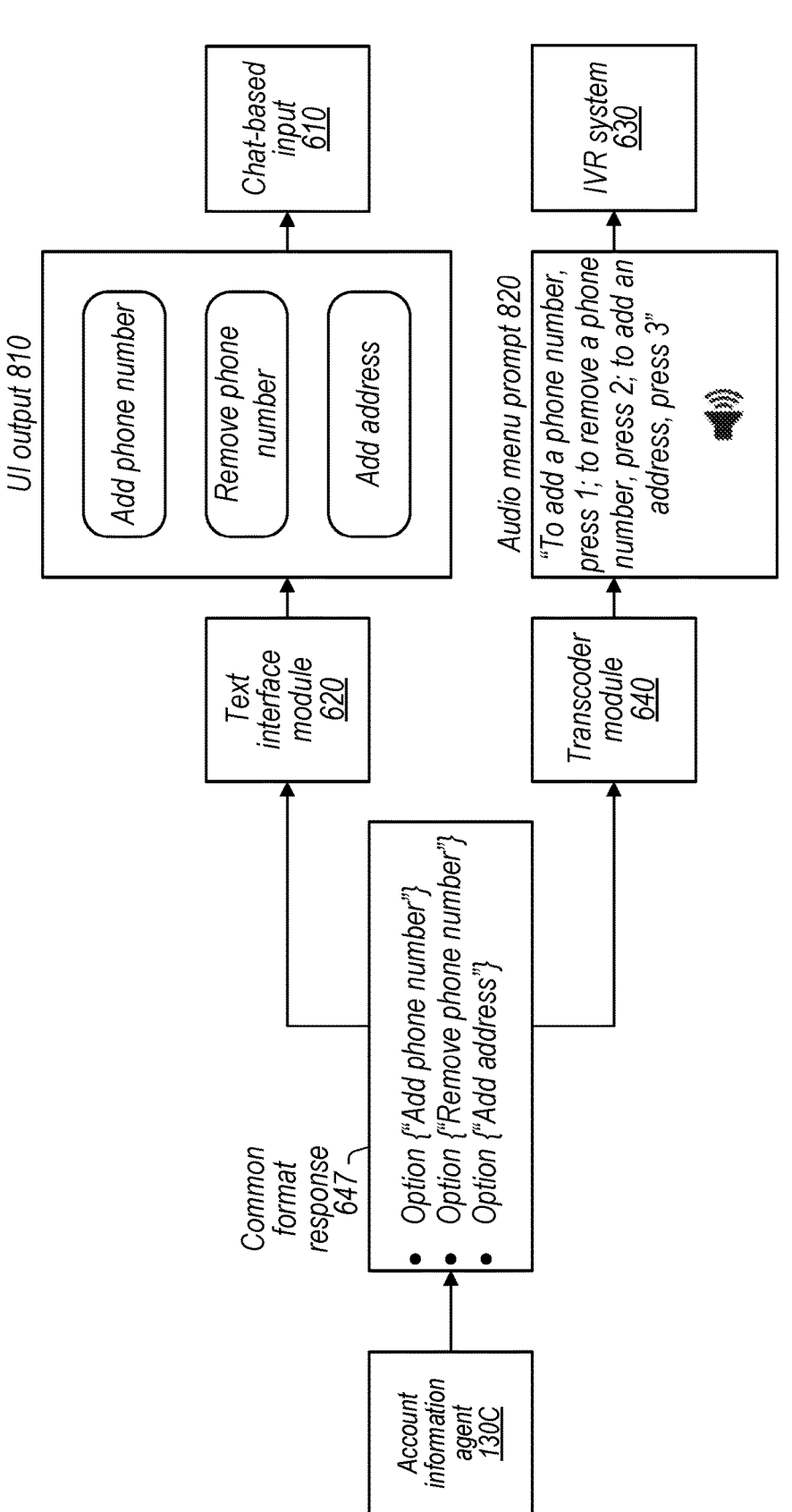
FIG. 8 is a block diagram of example conversions of a common format response for different input sources.

Turning now to FIG. 8, which depicts a block diagram of example conversions of common format response 647 for different input sources. As shown, account information agent 130C outputs common format response 647, which is then converted according to its destination—that is, chat-based input source 610 or IVR system 630. In the depicted example, common format response 647 includes information describing a menu with three account-related options for user selection: to add a phone number, to remove a phone number, or to add address. Common format response 647, in this case, may be formatted as a text file (e.g., JSON).

Text interface module 620 converts common format response 647 into a UI output 810 for return to chat-based input 610. As shown, UI output 810 is a graphical menu with three buttons, one representing a possible option specified in response 647. In some embodiments, UI output 810 is HTML code generated by text module 620 and rendered by a web browser hosting chat-based input source 610. In other embodiments, text interface module 620 forwards the common format response 647 to chat-based input source 610, which itself renders the UI in its own GUI.

Analogously, transcoder module 640 converts common format response 647 into audio menu prompt 820 for return to IVR system 630. As shown, audio menu prompt 820 is a synthesized audio file describing the various options of common format response 647 to the user and requesting a keypad input to the user corresponding to one of the options.

In some embodiments, transcoder module 640 uses a second voice interface and a TTV service (neither of which is shown), as described with respect to FIG. 7. In other embodiments, transcoder module 640 returns, as part of its response to IVR system 630, a VoiceXML file that is synthesized into voice by IVR system 630.

In addition to text interface module 620 and transcoder module 640, interface module 605 may include additional interface sub-modules that convert respective user inputs into common format response 647. For example, consider a third interface sub-module of interface module 605 that communicates with a game console. In that scenario, the third interface sub-module may convert common format response 647 into a UI menu similar to UI output 810 that asks the user to select an option using joystick buttons. Then, the user may select one of the three options using a combination of button presses on the console's joystick. Finally, the third interface module may receive the joystick button press and convert it into a common format input that indicates the corresponding selection (analogous to a common format request 645 that includes one or more keypress indications of a telephonic device). Thus, any input source that has an internet connection and a user interface can be "plugged in" using an appropriate interface sub-module in a manner analogous to text interface module 620 and transcoder module 640.

As discussed, conversational AI platform 600 enables any type of input to be used with AI core 608 (and thus virtual agents 130) when used with an appropriate interface module. This enables platform scalability: any platform, even traditional IVR systems that typically have to be separately developed, instead benefit from the skills already provided by virtual agents 130 without having to re-implement these skills with their respective methods. This paradigm thus allows a possibly limitless number of input types while reducing code and feature duplication across those input types.

Furthermore, when platform 600 is combined with system 100, an arbitrary number of input types can interact with an arbitrary number of virtual agents (via orchestration module 120) without duplicating developer efforts. Platform 600 combined with system 100 thus enables the scalability of both virtual agents (via system 100) and input types (via platform 600), and advantageously allows for a large number of possible combinations between input source types and virtual agents, as will be discussed in more detail with respect to FIG. 9.

Figure 9:
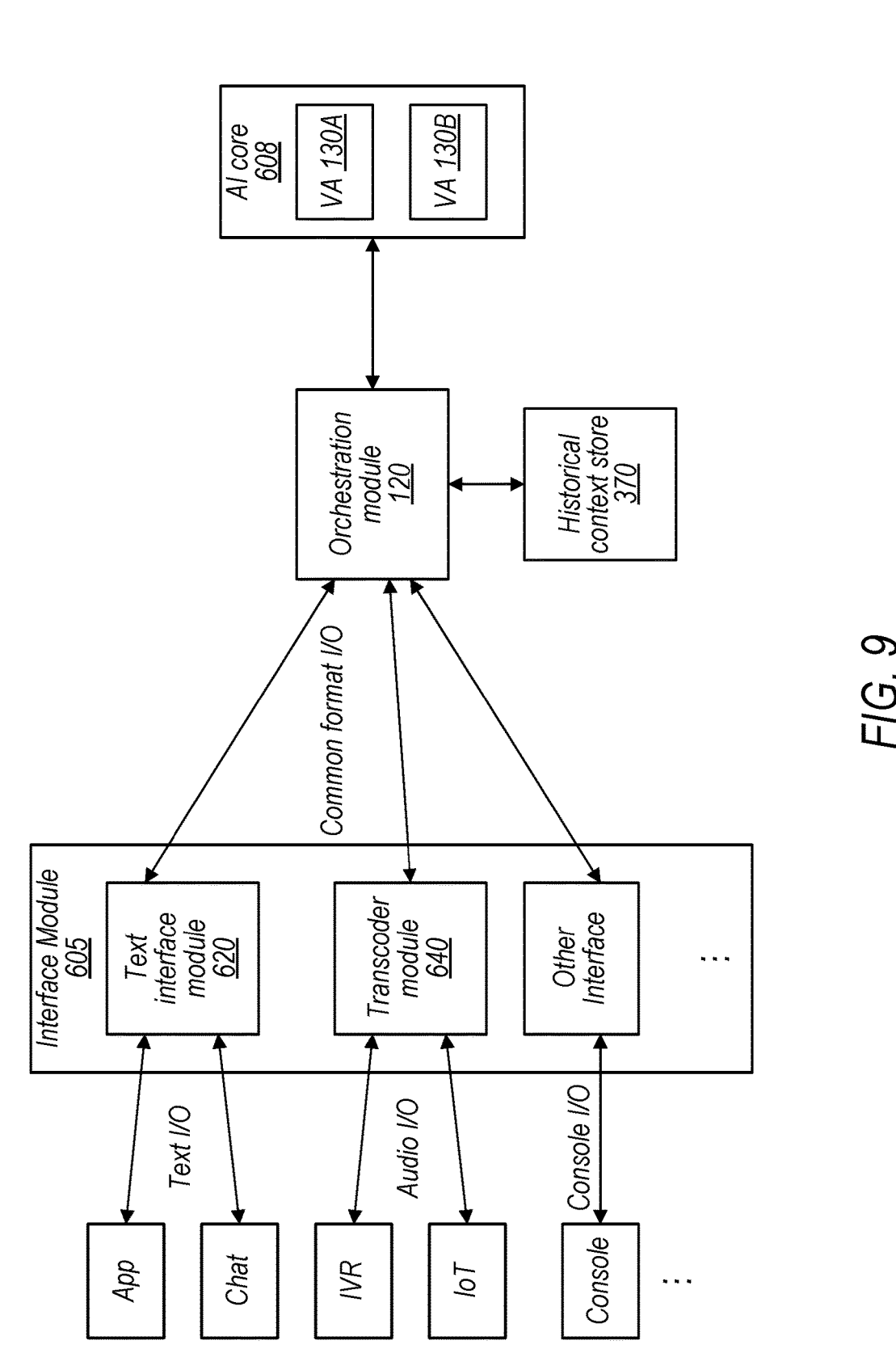
FIG. 9 is a block diagram illustrating one embodiment of a system that implements a conversational artificial intelligence platform for multiple virtual agents.

FIG. 9 depicts an example embodiment of a system 900 that implements both conversational AI platform 600 and system 100. As shown, multiple inputs communicate via interface module 605 to an example AI core 608 of system 100. Notably, interface module 605 enables interfacing with multiple input sources, while orchestration module 120 enables interfacing with multiple virtual agents 130 of AI core 608.

Combining conversational AI platform 600 and system 100 enables using different input types across multiple sessions. More specifically, using historical context store 370 enables the continuous storage of session data not only from multiple agents, but also from multiple input types. For example, consider a user who calls a 1-800 number to file a dispute via an IVR system, but the connection drops during the call. If the call had been routed through orchestration module 120, relevant data would be stored in historical context store 370. Thus, in certain embodiments, the user may complete filing the dispute by accessing to a browser-based chatbot, which can in turn communicate with orchestration module 120 and retrieve relevant information from the dropped phone call via historical context store 370. This allows the user to seamlessly go from a phone call to a chat, even when there was a service interruption. Note that while historical context store 370 is depicted as being stored externally with respect to orchestration module 120, it may be instead stored as part of orchestration module 120.

Furthermore, using historical context store 370 also enables simultaneously using different inputs during a single session. Consider, for example, a legally blind user seeking diagnostic help with a personal computer whose voice-to-text system is not properly functioning. Instead of forcing the user to use a graphical user interface to fix the voice-to-text system, system 900 would allow the user to access system 900 via mobile phone to receive automated assistance in fixing the personal computer. The user might first call an IVR support line that communicates with a support virtual agent via interface 605/orchestration module 120 and retrieve stored data from historical context store 370 to assist the user. During the call, the system might ask the user to simultaneously download an application, which can itself also communicate with an additional virtual agent that handles troubleshooting on system 900 via interface 605/orchestration module 120.

Other embodiments of system 900 are possible. For example, orchestration module 120 may be operable to communicate with multiple AI cores implemented by different providers. In that case, orchestration module 120 may interact with multiple interface modules, each coupled to a corresponding AI core. Once orchestrator 120 selects a virtual agent, it communicates with the selected virtual agent's corresponding interface module, which in turn converts communication with the AI core into an appropriate format compatible with its respective core. The use of AI core interface modules further enhances the scalability of system 900, as virtual agents may thus be provisioned by different providers. Orchestration module 120 may further coordinate routing of requests across AI cores. Orchestration module 120 may, using historical context store 370, store state information indicative of actions taken a virtual agent implemented by one AI core. Then, once orchestration module selects another virtual agent implemented by another AI core, it routes historical context store 370's state information to the other virtual agent (despite its implementation by the other AI core).

Turning now to FIG. 10, a flow diagram of a method 1000 is shown. Method 1000 is one embodiment of a method performed by a computer system (e.g., conversational AI platform 600) to enable multiple input sources to virtual agents. Method 1000 may be performed by executing a set of program instructions stored on a non-transitory computer-readable medium.

Method 1000 begins in step 1010 with the computer system receiving first input (e.g., text input 615) from a chat-based interface (e.g., chat-based input source 610). In some embodiments, the first input source is a home assistant device.

In step 1015, the computer system routes, by an interface module (e.g., interface module 605 via text interface module 620), a first request based on the first input to an artificial intelligence (AI) core (e.g. AI core 608) operable to handle the first request, the AI core including one or more virtual agents and the first request (e.g., common format request 625) being specified in a common input format. In some embodiments, a first subset of the one or more virtual agents utilize machine-learning techniques, and a second subset of the one or more virtual agents utilize rule-based techniques.

In step 1020, the computer system receives by the interface module from the AI core, first response data (e.g., common format response 627) responsive to the first request, the first response data being specified in a common output format.

In step 1025, the computer system outputs, by the interface module based on the first response data, first output data (e.g., text output 617) to the chat-based interface.

In step 1030, the computer system receives, by the interface module (e.g., via transcoder module 640) second input (e.g., IVR input) from an interactive voice response (IVR) system (e.g., IVR system 630). In some embodiments, the second input from the IVR includes an indication of one or more key presses made by a telephone device communicating with the IVR.

In step 1035, the computer system converts, by the interface module, the second input to a second request (e.g., common format request 645) having the common input format. In some embodiments, converting the second input further includes the computer system sending, by the interface module, the second input to a voice-to-text service, receiving, by the interface module from the voice-to-text service, text transcribed by the voice-to-text service from the second input, and including, by the interface module, the transcribed text in the second request.

In step 1040, the computer system routes, by the interface module, the second request to the AI core, the AI core being operable to handle the second request.

In step 1045, the computer system receives, by the interface module, second response data (e.g., common format response 647) responsive to the second request, the second response data being specified in the common output format.

In some cases, the first second response data includes information describing a menu with one or more options for user selection. Accordingly, the IVR system may receive the second response data and output, based on the second response data, an audio menu prompt such that a user of the IVR system can select a given one of the one or more options using: 1) a press of a telephone keypad button corresponding to the given option or 2) a voice command specifying the given option.

In step 1050, the computer system converts, by the interface module, the second response data to second output data (e.g., IVR output 637) compatible with the IVR system. In some embodiments, converting the second response data further includes generating, by the interface module, a transcript based on second response data, sending, by the interface module, the transcript to a text-to-voice service, receiving, by the interface module from the text-to-voice service, a synthesized speech output, and including, by the interface module, the synthesized speech output in the second output data.

In step 1055, the computer system sends, by the interface module, the second output data to the IVR system. In some embodiments, the second output data includes text information usable by the IVR system to generate synthesized sound.

In some embodiments, the computer system stores state information for a given request submitted via a particular input source, where the state information is usable by the computer system to transfer the given request from the particular input source to a different input source while the given request is in process. Furthermore, the state information may be usable by the computer system to transfer the given request from the IVR system to the chat-based interface in response to a break in communication with the IVR system. In some embodiments, the computer system stores state information for a given request sent by a particular input source, where the state information is indicative of actions taken by a given virtual agent relative to the given request. Then, the computer system transfers the given request and the state information from the particular input source to a different input source while the given request is in process.

In some embodiments, the system may support changing between multiple virtual agents using an orchestrator similar to the one described with respect to FIG. 3. For example, the CAI platform may include an orchestrator module that 1) determines, based on a given set of inputs from a given input source of the plurality of input sources, an intent, 2) selects a particular one of the one or more virtual agents based on the determined intent, and 3) route the given set of inputs to the selected virtual agent. The orchestrator module may further receive, from the particular virtual agent, an indication that the previously determined intent is no longer applicable, wherein the indication includes state information indicative of actions taken by the particular virtual agent relative to the set of inputs. Afterwards, the orchestration module selects, based on the state information, another one of the one or more virtual agents.

Exemplary Computer System

Figure 11:
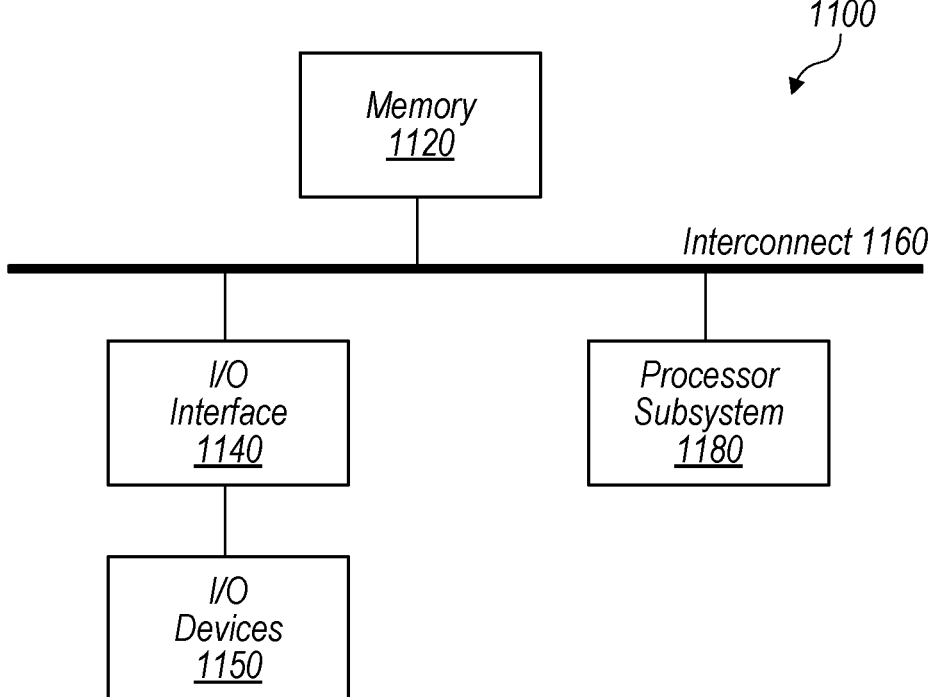
FIG. 11 is a block diagram illustrating elements of a computer system for implementing various systems described in the present disclosure.

Turning now to FIG. 11, a block diagram of an exemplary computer system 1100, which may implement system 100, platform 600, and/or system 900 is depicted. Computer system 1100 includes a processor subsystem 1180 that is coupled to a system memory 1120 and I/O interfaces(s) 1140 via an interconnect 1160 (e.g., a system bus). I/O interface(s) 1140 is coupled to one or more I/O devices 1150. Although a single computer system 1100 is shown in FIG. 11 for convenience, system 1100 may also be implemented as two or more computer systems operating together.

Processor subsystem 1180 may include one or more processors or processing units. In various embodiments of computer system 1100, multiple instances of processor subsystem 1180 may be coupled to interconnect 1160. In various embodiments, processor subsystem 1180 (or each processor unit within 1180) may contain a cache or other form of on-board memory.

System memory 1120 is usable store program instructions executable by processor subsystem 1180 to cause system 1100 to perform various operations described herein. System memory 1120 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1120. Rather, computer system 1100 may also include other forms of storage such as cache memory in processor subsystem 1180 and secondary storage on I/O Devices 1150 (e.g., a hard drive, storage array, etc.). In some embodiments, these other forms of storage may also store program instructions executable by processor subsystem 1180. In some embodiments, program instructions that when executed implement embedding engine 120 may be included/stored within system memory 1120.

I/O interfaces 1140 may be any of various types of interfaces configured to couple to and communicate with other devices, according to various embodiments. In one embodiment, I/O interface 1140 is a bridge chip (e.g., Southbridge) from a front-side to one or more back-side buses. I/O interfaces 1140 may be coupled to one or more I/O devices 1150 via one or more corresponding buses or other interfaces. Examples of I/O devices 1150 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is coupled to a network via a network interface device 1150 (e.g., configured to communicate over Wifi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a U.S. patent application based on this disclosure, it will recite claim elements using the "means for" [performing a function] construct.

What is claimed is:

1. A method, comprising:

receiving, by an orchestrator at a computer system and from an input source, a request that includes first text data specifying a first utterance of a user, wherein the orchestrator facilities communication with a plurality of virtual agents having different skill sets;

determining, by the orchestrator based on the first utterance, an intent of the user;

selecting, by the orchestrator based on the determined intent of the user, a first one of the plurality of virtual agents to handle the request, wherein the first virtual agent is selected based the first virtual agent having a first skill set relevant to the determined intent of the user;

routing, by the orchestrator based on the selecting, the first text data and subsequent text data of the request to the first virtual agent;

receiving, by the orchestrator, an indication that the determined intent of the user is no longer applicable to the request; and selecting, by the orchestrator based on the received indication, a second one of the plurality of virtual agents to handle the request, wherein the second virtual agent has a second skill set distinct from the first skill set.

2. The method of claim 1, wherein determining the intent of the user includes:

sending, by the orchestrator to a natural language processing (NLP) service, an intent request based on the first utterance; and receiving, by the orchestrator from the NLP service in response to the intent request, an intent response that includes the determined intent of the user.

3. The method of claim 2, wherein the intent response includes a confidence score associated with the determined intent of the user.

4. The method of claim 1, wherein the indication is received from the first virtual agent in response to a determination by the first virtual agent that the previously determined intent of the user was incorrect.

5. The method of claim 4, wherein the determination that the previously determined intent of the user was incorrect is based on a confidence score associated with the previously determined intent of the user.

6. The method of claim 4, further comprising:

sending to the user, in response to the determination that the previously determined intent of the user was incorrect, a digression resolution request; and receiving from the user, responsive to the digression resolution request, a digression resolution response that causes the selection of the second virtual agent.

7. The method of claim 1, wherein the indication is received from the input source, and specifies a change in intent by the user.

8. The method of claim 1, wherein the selecting of the second virtual agent is based on the computer system determining that the request requires multiple virtual agents to be completed, including the first and second virtual agents.

9. The method of claim 1, wherein the selecting of the first virtual agent further includes:

performing, by the computer system using the determined intent of the user, a lookup operation on an intent map data structure; and retrieving, by the computer system using the intent map data structure, an identifier of the first virtual agent corresponding to the determined intent of the user.

10. The method of claim 9, wherein:

the intent map data structure includes a given entry that describes a mapping of a given intent to a given sequence of virtual agents, such that each virtual agent in the sequence completes a portion of the request; and the operations further comprise:

performing, based on receiving a given request, a lookup that results in retrieving the given sequence of virtual agents;

routing, based on the sequence of virtual agents, the request to the first virtual agent of the sequence; and routing, based on a previous agent completing its respective portion of the request, the request to the next virtual agent of the sequence, until the request is completed.

11. The method of claim 1, wherein the input source is an interactive voice response (IVR) system, the first utterance is based on voice input from the user, and the first text data is generated by converting the first utterance to text.

12. A non-transitory, computer-readable storage medium storing program instructions executable by a computer system to perform operations comprising:

receiving, by an orchestrator and from an input source, a request that includes first text data specifying a first utterance of a user, wherein the orchestrator serves as an intermediary between the input source and a plurality of virtual agents;

determining, by the orchestrator, an intent of the user based on the first utterance;

selecting, by the orchestrator, a first of a plurality of virtual agents based on an ability of the first virtual agent to handle requests associated with the determined intent of the user;

routing, by the orchestrator based on the selecting, the first text data and subsequent text data of the request to the first virtual agent;

receiving, by the orchestrator from the first virtual agent, an indication that the determined intent of the user is no longer applicable to the request; and selecting, by the orchestrator based on the received indication, a second one of the plurality of virtual agents to handle the request.

13. The non-transitory, computer-readable storage medium of claim 12, wherein the second virtual agent is selected using additional user input received in response to one or more user prompts.

14. The non-transitory, computer-readable storage medium of claim 12, wherein selecting the first virtual agent includes sending a confidence score associated with the determined intent of the user to the first virtual agent; and wherein the indication that the previously determined intent of the user is no longer applicable to the request is based on analysis by the first virtual agent of additional input received from the user as part of the request and the confidence score.

15. The non-transitory, computer-readable storage medium of claim 12, wherein the operations further comprise:

receiving, from the second virtual agent, transfer information indicating that the request is to be completed by a third of the plurality of virtual agents; and selecting, based on the transfer information, the third virtual agent to complete the request.

16. The non-transitory, computer-readable storage medium of claim 13, wherein the operations further comprise:

storing, by the computer system, state information indicative of actions taken by the first virtual agent relative to the request; and sending, by the computer system, the state information to the second virtual agent as part of selecting of the second virtual agent.

17. The non-transitory, computer-readable storage medium of claim 13, wherein the input source is an interactive voice response (IVR) system, the first utterance is based on voice input from the user, and the first text data is generated by converting the first utterance to text.

18. A system, comprising:

one or more processor circuits;

a memory storing program instructions executable by the one or more processor circuits to implement a conversational artificial intelligence (AI) platform that includes:

a plurality of virtual agents that includes a first virtual agent having a first skill set and a second virtual agent having a second skill set;

an orchestration module operable to:

receive a request that includes first text data specifying an utterance of a user;

determine, from the utterance, an intent of the user;

select the first virtual agent to handle the request based on the determined intent of the user and the first skill set of the first virtual agent;

route the first text data and subsequent text data of the request to the first virtual agent for handling;

receive, from the first virtual agent, a message that the determined intent of the user is no longer applicable to the request, the message including state information indicative of actions taken by the first virtual agent relative to the request; and select the second virtual agent to handle the request based on the state information and the second skill set of the second virtual agent.

19. The system of claim 18, wherein the state information includes an identifier of a given virtual agent, where the identifier is used in the routing of text data to the given virtual agent.

20. The system of claim 18, wherein the system further includes an interactive voice response (IVR) system, and the first text data is based on an input to the IVR system.

* * * * *